(12) United States Patent
Suzuki et al.

(10) Patent No.: US 9,908,486 B2
(45) Date of Patent: Mar. 6, 2018

(54) METHOD FOR MANUFACTURING A WIRE HARNESS

(71) Applicants: DAIWA KASEI INDUSTRY CO., LTD., Aichi (JP); TOYOTA JIDOSHA KABUSHIKI KAISHA, Aichi-ken (JP)

(72) Inventors: Makoto Suzuki, Aichi (JP); Yuusuke Ito, Aichi (JP); Yousuke Ogino, Aichi (JP); Kentaro Furuki, Aichi-ken (JP)

(73) Assignees: DAIWA KASEI INDUSTRY CO., LTD., Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 21 days.

(21) Appl. No.: 15/256,955

(22) Filed: Sep. 6, 2016

(65) Prior Publication Data
US 2017/0246997 A1    Aug. 31, 2017

(30) Foreign Application Priority Data

Feb. 26, 2016   (JP) .................................. 2016-036241

(51) Int. Cl.
| | | |
|---|---|---|
| *H01R 43/00* | (2006.01) | |
| *B60R 16/02* | (2006.01) | |
| *H01B 13/012* | (2006.01) | |
| *H01R 43/24* | (2006.01) | |
| *H02G 3/30* | (2006.01) | |
| *H02G 3/32* | (2006.01) | |

(52) U.S. Cl.
CPC ... *B60R 16/0215* (2013.01); *H01B 13/01209* (2013.01); *H01R 43/24* (2013.01); *H02G 3/30* (2013.01); *H02G 3/32* (2013.01)

(58) Field of Classification Search
CPC .. B60R 16/0207; B60R 13/0206; H02G 1/06; Y10T 29/49176; Y10T 29/49824; Y10T 29/53657; F16B 21/07; H01R 13/73; H01R 2201/26
USPC ........................... 29/858, 428, 450, 825, 856
See application file for complete search history.

(56) References Cited

U.S. PATENT DOCUMENTS

| | | | | |
|---|---|---|---|---|
| 5,906,465 A | * | 5/1999 | Sato ...................... | F16B 21/084 248/68.1 |
| 9,640,956 B2 | * | 5/2017 | Tsukamoto .......... | H02G 3/0468 |
| 2016/0181776 A1 | | 6/2016 | Tsukamoto et al. | |

FOREIGN PATENT DOCUMENTS

| | | |
|---|---|---|
| JP | 1986-161913 | 7/1986 |
| JP | 2000289047 A | 10/2000 |
| JP | 2005026178 A | 1/2005 |
| JP | 2005199482 A | 7/2005 |
| JP | 2005-341776 | 12/2005 |
| JP | 2007-130814 | 5/2007 |

(Continued)

*Primary Examiner* — Thiem Phan
(74) *Attorney, Agent, or Firm* — McClure, Qualey & Rodack, LLP

(57) ABSTRACT

An objective is to provide a manufacturing method and a manufacturing device for a wire harness, and the wire harness and a retention component manufactured thereby, the wire harness including a wiring bundle, a retention portion configured to retain the wiring bundle, and an engagement portion to be attached to a vehicle body, the manufacturing method and the manufacturing device being capable of efficiently manufacturing the wire harness and being applicable to engagement portions having different shapes.

7 Claims, 35 Drawing Sheets

(56) References Cited

FOREIGN PATENT DOCUMENTS

| JP | 2013-041676 | 2/2013 |
|---|---|---|
| JP | 2013-041677 | 2/2013 |
| JP | 2014222628 A | 11/2014 |
| JP | 2015044310 A | 3/2015 |

* cited by examiner

METHOD FOR MANUFACTURING A WIRE HARNESS

RELATED APPLICATIONS

This application claims the priority of Japanese Patent Application No. 2016-036241 filed on Feb. 26, 2016. The disclosure of the prior application is hereby incorporated herein in the entirety by reference.

BACKGROUND OF THE INVENTION

Field of the Invention

This invention relates to a retention component for, a wiring bundle, a wire harness including the retention component, and a manufacturing method and manufacturing device for the wire harness.

Description of Related Art

For example, in a vehicle, attachment objects such as a wire harness are laid in a vehicle body. In this case, a wiring bundle forming the wire harness is tied and retained by a retention component, and the retention component is attached to the vehicle body. Examples of such a retention component include a so-called belt clamp or the like for tying the wiring bundle with a belt (see Japanese Laid-Open Patent Publication No. 2005-341776). The belt clamp is provided with the belt as a retention portion to retain the wiring bundle, and an engagement portion to be attached to the vehicle body, and the retention portion and the engagement portion form one unitary body.

SUMMARY OF THE INVENTION

While the retention component that ties the wiring bundle with a manual operation is often used, a development of a technique of directly molding a retention component as described above on a wire harness has been advancing. According to this technique, the wire harness is disposed in a metal mold, and a resin is injected into the metal mold to simultaneously and integrally mold a retention portion that annularly surrounds an outer circumference of the wire harness, and an engagement portion that is integral with the retention portion. This technique able to achieve the molding of the retention portion and the tying of the wire harness simultaneously, and to eliminate the need for a worker to perform a tying operation by hands. Thus, a significant improvement in working efficiency can be achieved.

However, this technique has posed a new problem in that, in the case where the engagement portion is to have a complicated shape, the resin may not reach an end of a space for molding the engagement portion in the metal mold.

As a solution to this new problem, a method of increasing injection pressure in injecting the resin to cause the resin to reach up to each end of a molding space is conceivable. This method, however, may cause an abnormal shape of the molded retention port on. Specifically, when a molding process is performed, the wiring bundle is disposed in a center of a columnar molding space for molding an annular retention portion, and the resin is loaded to an annular space formed outside of the wiring bundle. As a result, the annular retention portion is molded. However, if the resin is caused to flow into this annular space with a high injection pressure, the wiring bundle may be pressed by the resin and be displaced from the center of the columnar molding space. This may result in the molded retention portion having a decreased thickness on a side toward which the wiring bundle is displaced, which in turn may result in insufficient retention strength. In some cases, the molded retention portion may not be annular, having a separation on the side toward which the wiring bundle is displaced. In addition, the wiring bundle, which is a bundle of multiple wiring members, has a rugged outer surface. That is, between the wiring members, each of which is columnar and which together form the wiring bundle, a plurality of grooves extending in a long side direction of the wiring members are formed, each groove being formed between adjacent ones of the wiring members on the outer surface of the wiring bundle. A high injection pressure may cause the resin to leak out along these grooves.

Meanwhile, there is another problem regarding the metal mold. As attachment holes of vehicle bodies have a variety of shapes, engagement portions having a variety of shapes are accordingly used. Therefore, if separate dedicated metal molds were used for the respective engagement portions having different, shapes, a great number of metal molds would be required, leading to an increased cost. Further, the great number of metal molds should be selectively used, leading to a reduction in working efficiency.

An objective of this invention is to provide a manufacturing method and a manufacturing device for a wire harness, and the wire harness and a retention component manufactured thereby, the wire harness including a wiring bundle, a retention portion configured to retain the wiring bundle, and an engagement portion to be attached to a vehicle body, the manufacturing method and the manufacturing device being capable of efficiently manufacturing the wire harness, and being applicable to engagement portions having different shapes.

In order to achieve the above described objective, a method for manufacturing a wire harness according to an aspect of this invention including an engagement portion to be attached to a vehicle body, a wiring bundle formed of multiple wiring members, and a retention portion configured to retain the wiring bundle, with usage of a metal mold having: a wiring bundle disposition hole in which the wiring bundle is penetratingly disposed; an annular retention portion-molding space arranged at an intermediate section of the wiring bundle disposition hole to surround an outer circumference of the disposed wiring bundle; an engagement portion-accommodating space in which an insert part having a penetration hole formed therein and which is to become the engagement portion is disposed such that the penetration hole is communicatively connected with the retention portion-molding space; and a resin inflow opening through which a melt resin is poured into the penetration hole of the insert part disposed in the engagement portion-accommodating space, the method including: penetratingly disposing the wiring bundle in the wiring bundle disposition hole of the metal mold; disposing the insert part in the engagement, portion-accommodating space; pouring the melt resin through the resin inflow opening to load the melt resin to the retention portion-molding space through the penetration hole of the insert part; and solidifying the melt resin through cooling to form the wire harness, the wire harness including the wiring bundle, the retention portion, and the engagement portion formed by the insert part, the retention portion having an annular portion molded in a state of being closely adhered to a rugged outer circumferential surface of the wiring bundle in the retention portion-molding space, and a core portion molded in the penetration hole, the annular portion and the core portion being molded integrally with each other, the retention portion being joined to the insert part.

In order to achieve the above described objective, a wire harness according to an aspect of this invention includes:

a wiring bundle formed of multiple wiring members;

a retention portion made of a resin, and including an annular portion configured to surround and retain the wiring bundle while being closely adhered to a rugged outer circumferential surface of the wiring bundle, and a core portion projecting outward from an outer circumferential surface of the annular portion, the annular portion and the core portion forming one unitary body;

an engagement portion made of a resin, and including a shaft portion capable of being inserted into a predetermined attachment hole on a vehicle body side, an engagement attachment portion capable of being engaged with and attached to a surrounding portion of the attachment hole, and a connecting portion connected to the retention portion, the shaft portion, the engagement attachment portion, and the connecting portion forming one unitary body; and a penetration hole formed in the engagement portion so as to penetrate the engagement portion, and having the core portion disposed therein.

In order to achieve the above described objective, a retention component according to an aspect of this invention includes:

a retention portion made of a resin, and including an annular portion configured to surround and retain a wiring bundle formed of multiple wiring members while being closely adhered to a rugged outer circumferential surface of the wiring bundle, and a core portion projecting outward from an outer circumferential surface of the annular portion, the annular portion and the core portion forming one unitary body;

an engagement portion made of a resin, and including a shaft portion capable of being inserted into a predetermined attachment hole on a vehicle body side, an engagement attachment portion capable of being engaged with and attached to a surrounding portion of the attachment hole, and a connecting portion connected to the retention portion, the shaft portion, the engagement attachment portion, and the connecting portion forming one unitary body; and a penetration hole formed in the engagement portion so as to penetrate the engagement portion, and having the core portion disposed therein.

According to the above aspects of this invention, the molding of the retention portion and the tying of the wiring bundle can be achieved simultaneously, eliminating the need for a worker to perform a conventional tying operation by hands. Thus, a significant improvement in working efficiency can be achieved. In addition, according to the above aspects of this invention, an engagement portion having a complicated shape is prepared beforehand as the insert part, and an abnormal shape of the engagement portion is not caused.

In addition, in the above aspects of this invention, the metal mold may be configured to include a first mold having the resin inflow opening (a so-called gate) and a space in which the engagement portion is disposed, and a second mold which forms the retention portion-molding space together with the first mold, or which has the entire retention portion-molding space formed therein, the first and second molds being fitted to each other. In the case of this configuration, when the melt resin is guided from the first mold having the resin inflow opening to the second mold having the retention portion-molding space, the penetration hole of the insert part (which is to become the engagement portion after the molding) serves as a passage through which the resin passes from the first mold to the second mold. Accordingly, a plurality of types of first molds each having the resin inflow opening may be prepared for a variety of shapes of engagement portions, with the second mold being used as a common metal mold which can be used in conjunction with all the first molds. This makes it possible to efficiently manufacture wire harnesses having engagement portions having different shapes.

Further, in the molded retention portion, the annular portion configured to retain the wiring bundle and the core portion disposed in the penetration hole of the engagement portion form one unitary body. In the case where the engagement portion and the retention portion are made of the same resin material, the engagement portion and the retention portion are unified in the penetration hole at the time of the molding, and this prevents the retention portion from being detached from the engagement portion. Meanwhile, in the case where the engagement portion and the retention portion are made of different resin materials, the penetration hole of the engagement portion may be configured to have a shape that causes the core portion to have a detachment preventing portion to prevent a detachment of the core portion from the penetration hole, in order to reduce the likelihood that the retention portion will be detached from the engagement portion. For example, if the core portion is configured to include a central shaft portion having a cross section identical to the cross section of an opening on the retention portion side, the cross section being perpendicular to an axis of the core portion, and an outer circumferential portion which expands in directions perpendicular to the axis of the core portion, the outer circumferential portion forms the detachment preventing portion.

Still further, the wiring bundle has the rugged outer circumferential surface. Concavities of the rugged outer circumferential surface form grooves each of which extends in a long side direction of the wiring bundle. Accordingly, the resin loaded into the retention portion-molding space may leak out along the grooves of the outer circumferential surface of the wiring bundle. According to the above aspects of this invention, the resin inflow opening is provided on the engagement portion-accommodating space side, and the resin reaches the retention portion-molding space after passing through the engagement portion-accommodating space (that is, the penetration hole of the engagement portion). When having reached the retention portion-molding space, the resin has decreased in temperature and increased in viscosity, and further, has decreased in pressure as well, and therefore, the resin does not easily leak out through an inter-wire gap forming a concavity, which is convenient also from a standpoint of preventing a leakage. In addition, a reduction is pressure in the resin, which has reached the retention portion-molding space, means a reduction in a force that tries to press the wiring bundle, located at the center of the annular retention portion-molding space, so as to displace the wiring bundle from the center of the annular retention portion-molding space, and is convenient also from a standpoint of being able to mold the annular retention portion with certainty.

BRIEF DESCRIPTION OF THE DRAWINGS

FIG. 40 is a diagram for explaining a first specific example related to the manufacturing process shown in FIG. 39, using the same cross section as in FIG. 14;

DESCRIPTION OF THE PREFERRED EMBODIMENTS

Figure 1A:
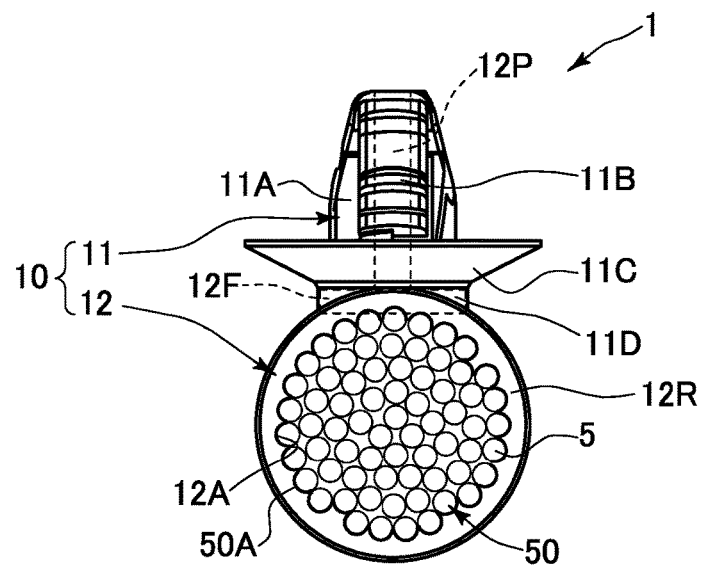
FIG. 1A is a side view of a wire harness according to a first embodiment of this invention.

In the following, embodiments of this invention will be described with reference to the examples shown in the drawings.

Figure 1B:
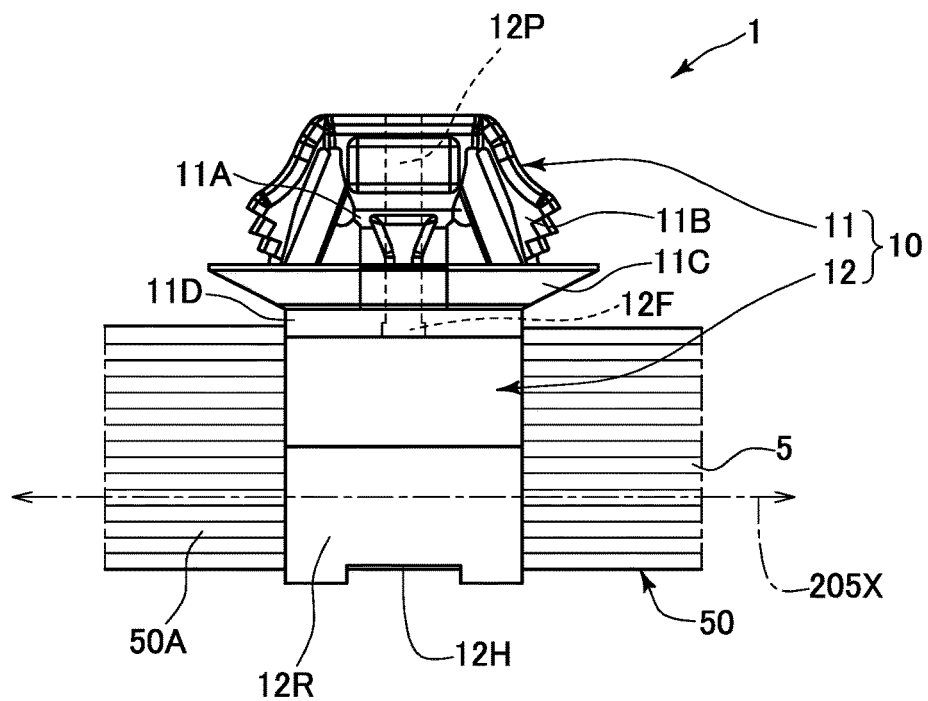
FIG. 1B is a front view of the wire harness shown in FIG. 1A.

As shown in FIGS. 1A and 1B, a retention component 10 of this embodiment is formed as a resin molded body including an engagement portion 11 to be attached to a vehicle body, and a retention portion 12 configured to retain a wiring bundle 50 formed of multiple wiring members 5, with the engagement portion 11 and the retention portion 12 fixed to each other. A wire harness 1 has the retention component 10, and the wiring bundle 50 retained in a closely adhered state by the retention portion 12 of the retention component 10. The wiring members 5 are those that are known in the art, including an electrically conductive core wire formed of one or more lead wires, and an electrically non-conductive cover portion configured to cover the outer circumference of the core wire.

Figure 2:
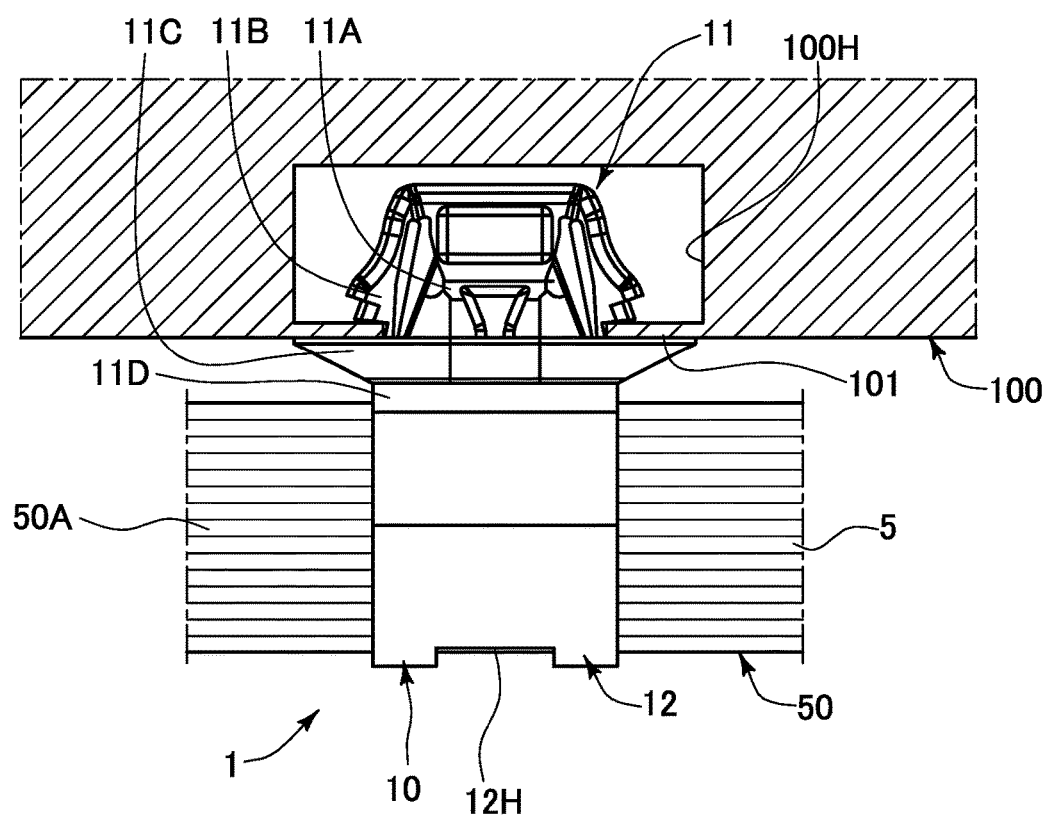
FIG. 2 shows an example of a state is which the wire harness shown in FIGS. 1A and 1B is attached on a vehicle body side.

As shown in FIG. 2, the engagement portion 11 is a part that is to be attached to a vehicle body 100 side when the engagement portion 11 is inserted in, and is engaged within, a predetermined attachment hole 100H formed on a harness attachment portion on the vehicle body 100 side. The engagement portion 11 is a part made of a resin and including a columnar shaft portion 11A capable of being inserted into the predetermined attachment hole 100H on the vehicle body 100 side, elastic portions 11B and a contact portion 11C which form an engagement attachment portion capable of being engaged with and attached to a surrounding portion 101 of the attachment hole 100H, and a connecting portion 11D connected to the retention portion 12, with the portions 11A to 11D forming one unitary body. The engagement portion 11 enters an engaged state and is attached to the vehicle body 100 side, with the hole surrounding portion 101 forming the attachment hole 100H on the vehicle body 100 side being sandwiched by the elastic portions 11B inserted into the attachment hole 100H and the contact portion 11C not inserted into the attachment hole 100H.

The elastic portions 11B are provided on a front end (a leading end of an insertion direction toward the attachment hole 100H) side of the shaft portion 11A. Specifically, the elastic portions 11B have a shape extending out so as to expand outwards from the front end side (an opposite side of the retention portion 12) toward the back end side (the side of the retention portion 12) of the shaft, portion 11A, and the extension leading side of the elastic portion 11B can, by using a base end side thereof as a root, elastically deform inwards toward the shaft portion 11A side. When being attached to the vehicle body 100 side, the elastic portion 11B functions as an elastic engagement portion configured to prevent detachment from the attachment hole 100H, since the elastic portion 11B is inserted in the attachment hole 100H in an inward-contracted form resulting from the elastic deformation and expands outward after being inserted because of elastic restoration.

The contact portion 11C is provided on the back end side of the shaft portion 11A. Specifically, the contact portion lip extends out so as to expand outwards from the back end side toward the leading end side of the shaft portion 11A, and, when being attached to the vehicle body 100 side, not inserted in the attachment hole 100H and the leading end of the contact portion 11C contacts the surrounding surface of the attachment hole 100H. In this embodiment, a rear end part of the shaft portion 11A is the connecting portion 11D that connects to the retention portion 12.

As shown in FIGS. 1A and 1B, the retention portion 12 is a part configured to retain the wiring bundle 50 in a tied state, and includes an annular portion 12R formed annularly so as to surround the outer circumference of the wiring bundle 50 in a form of being closely adhered to an outer circumferential surface 50A of the wiring bundle 50. The annular portion 12R is formed in the shape of a cylinder to surround the wiring bundle 50. An inner circumferential surface 12A of the annular portion 12R is formed to be rugged in accordance with the rugged outer circumferential surface of the wiring bundle 50. Thus, in this embodiment, the inner circumferential surface 12A of the retention portion 12 fills the gaps of the ruggedness on the outer circumferential surface 502 of the wiring bundle 50 to obtain a closely adhered state.

The retention component 10 is characterized in being manufactured such that molding of the retention portion 12 and tying and retaining of the wiring bundle 50 by the retention portion 12 are conducted simultaneously. Thus, the wire harness 1, with the wiring bundle 50 being tied and retained, is obtained. Further, the retention component 10 is manufactured such that the retention portion 12 is joined to a previously-prepared insert part 110 (see FIGS. 3A, 3B, and 3C) which is to become the engagement portion 11. That is, the retention component 10 is manufactured by an insert molding process using the insert part 110, which is to become the engagement portion 11.

Figure 3A:
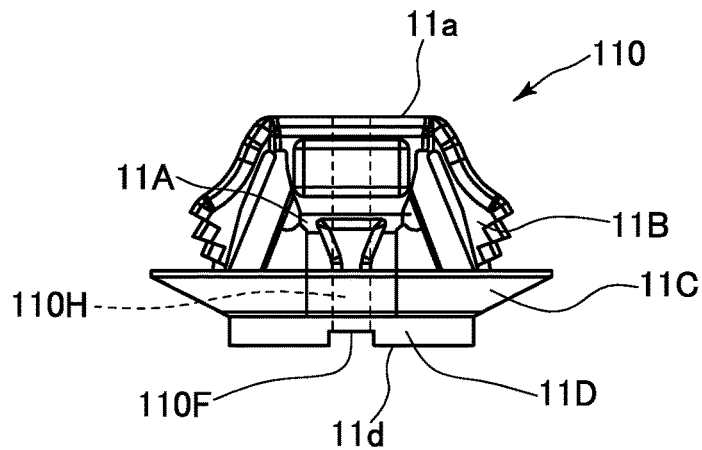
FIG. 3 is a front view of an insert part which is to become an engagement portion of the wire harness shown in FIGS. 1A and 1B.
FIG. 3B is a plan view of the insert part shown in FIG. 3A.
FIG. 3C is a bottom view of the insert part shown in FIG. 3A.
Figure 3B:
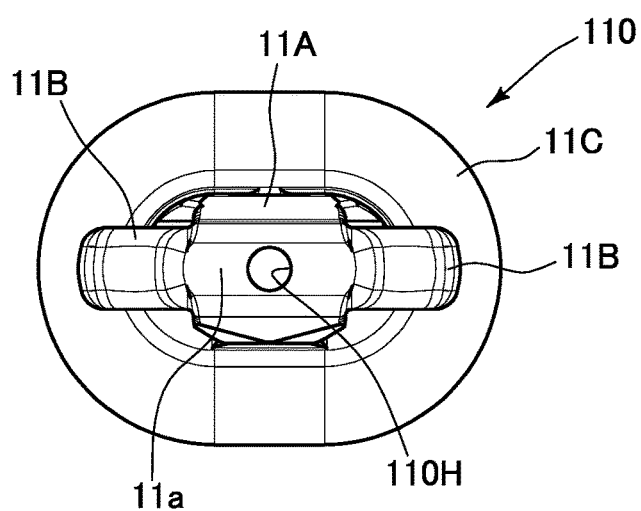
Figure 3C:
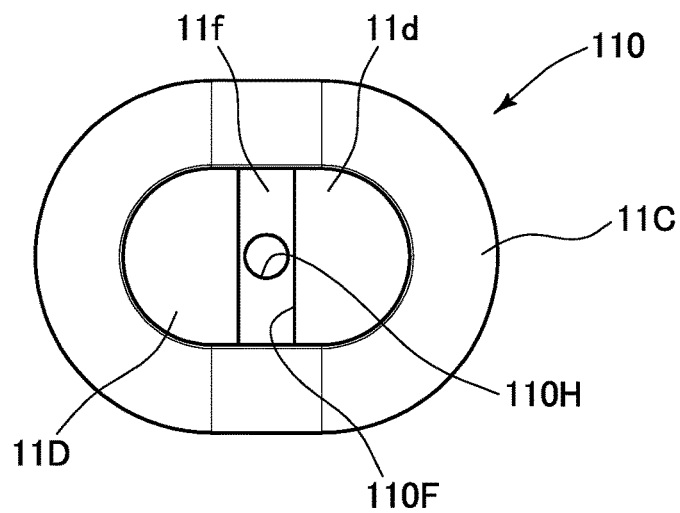

As shown in FIGS. 3A to 3C, the insert part 110, which is to become the engagement portion 11, includes a penetration hole 110H that penetrates the engagement portion 11. The penetration hole 110H is a space that has an opening in a top end surface (or a front end surface) 11a of the shaft portion 11A, and which penetrates the shaft portion 11A and the connecting portion 11D in an axial direction of the shaft portion 11A. In addition, the insert part 110 further includes a penetration hole width increasing opening portion 110F that opens on the back end side of the penetration hole 110H (i.e., on the side on which the retention portion 12 is joined to the insert part 110) so as to increase the hole width of the penetration hole 110H in a direction perpendicular to the axial direction of the penetration hole 110H. Here, as shown in FIG. 3C, the penetration hole width increasing opening portion 110F is a groove portion 110F formed in a rear end surface (i.e., an end surface of the connecting portion 11D on the retention portion 12 side) 11d of the shaft portion 11A, and extending in a straight line in a direction perpendicular to an axis of the shaft portion 11A. The penetration hole 110H is formed so as to penetrate the insert part 110 and have an opening in a groove bottom surface 11f of the groove portion 110F. In the rear end surface 11d, which is substantially in the shape of an ellipse, the groove portion 110F is formed so as to extend in a straight line along a minor axis of the ellipse. Note that the rear end surface 11d, which is substantially in the shape of an ellipse, has a major-axis direction along a direction in which the two elastic portions 11B, which extend from the front end side of the shaft portion 11A so as to become farther away from each other with the shaft portion 11A therebetween, are arranged.

As shown in FIG. 1A, the retention portion 12 to be molded is a part made of a resin and including the annular portion 12R, a core portion 12P arranged in the penetration hole 110H of the insert part 110, and a groove filling portion 12F arranged in the groove portion 110F of the insert part 110, with the annular portion 12R, the core portion 12P, and the groove filling portion 12F forming one unitary body. The annular portion 12R is in the shape of a cylinder and surrounds and retains the wiring bundle 50. The core portion 12P is columnar and projects outward from an outer circumferential surface of the annular portion 12R. Further, the core portion 12P is shaped so as to be arranged in the penetration hole 110H, which is formed in and penetrates the insert part 110, and has a shape matching the shape of the penetration hole 110H. The core portion 12P is columnar. The groove filling portion 12F is shaped so as to extend in a direction perpendicular to an axis of the core portion 12P on a base end side of the core portion 12P (i.e., on the annular portion 12R side). Still further, the groove filling portion 12F is shaped so as to extend in the radial direction of the annular portion 12R and in a direction perpendicular to the axis of the core portion 12P from the base end side of the core portion 12P.

Note that, when the retention portion 12 is molded using the insert part 110 (see FIGS. 3A to 3C), a resin material of the insert part 110 and a resin material of the retention portion 12 are the same. Accordingly, at the time of the molding, the retention portion 12 and the insert part 110 are welded to each other to form one unitary body, eliminating a boundary therebetween. Therefore, after the molding, the penetration hole 110H and the groove portion 110F in the engagement portion 11 and the core portion 12P and the groove filling portion 12F in the retention portion 12 are unified and are not visually distinguishable.

Here, a method for manufacturing the wire harness 1 and the retention component 10 according to this embodiment will now be described below.

Figure 4:
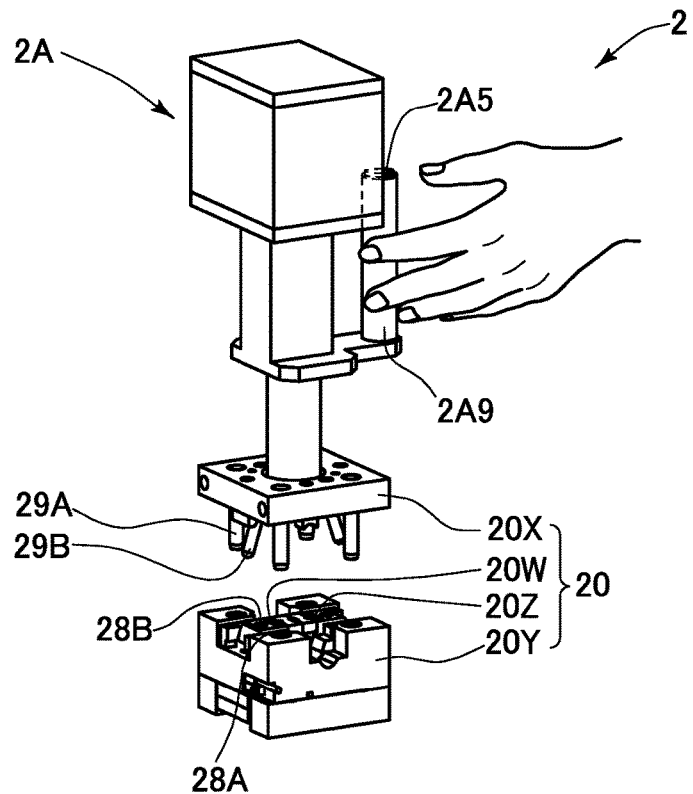
FIG. 4 shows a mold-opened state of a metal mold in a manufacturing device configured to manufacture the wire harness shown in FIGS. 1A and 1B.
Figure 5:
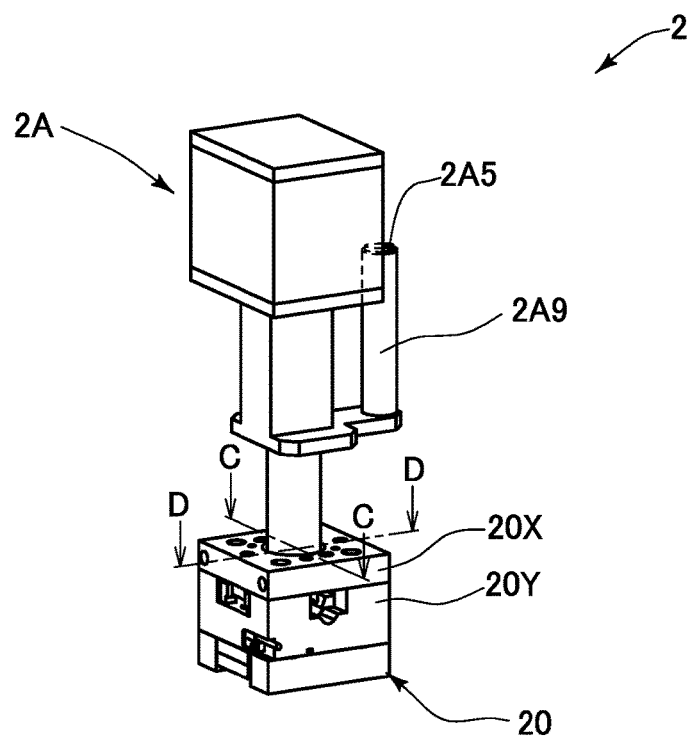
FIG. 5 shows a mold-closed state of the metal mold in the manufacturing device in FIG. 4.
Figure 6:
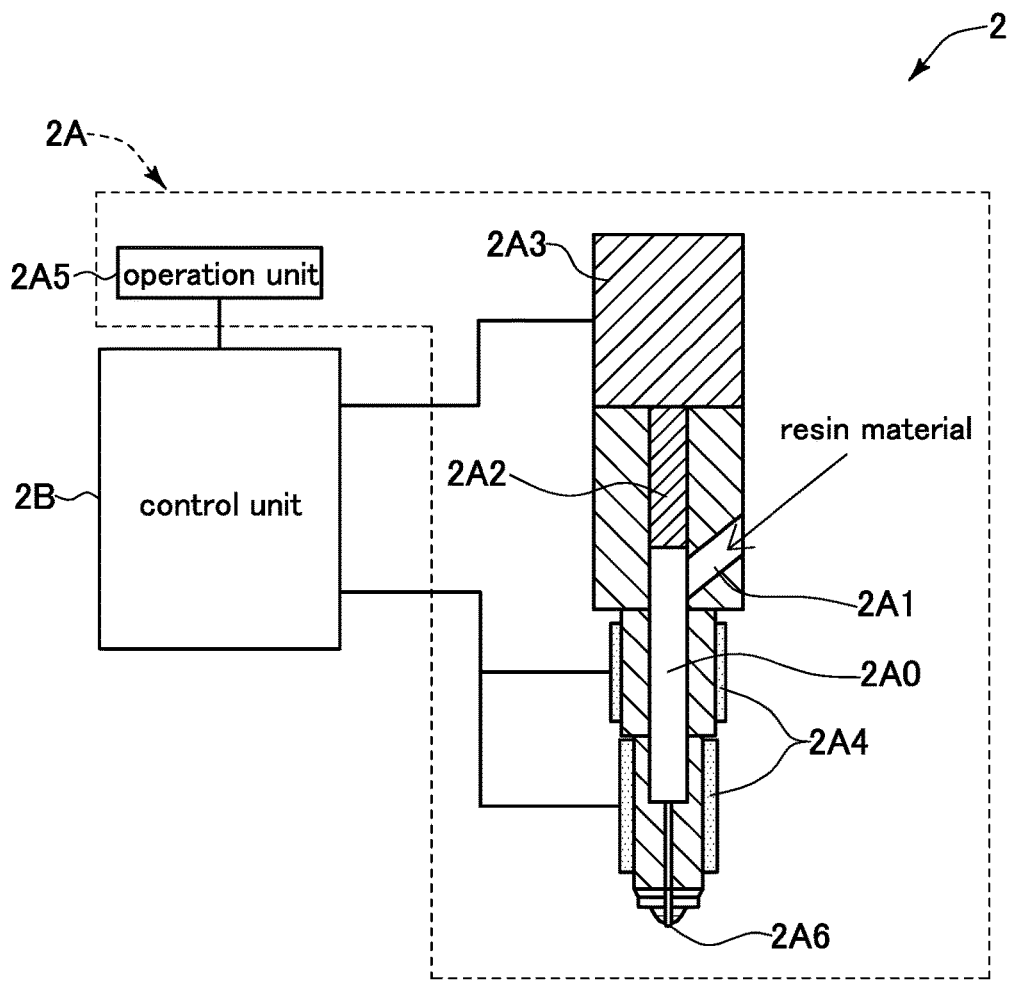
FIG. 6 is a block diagram showing, in a simple manner, the electrical configuration of the manufacturing device in FIG. 4.

First, a molding machine (i.e., a manufacturing device) 2 used for manufacturing the wire harness 1 and the retention component 10 will now be described below. As shown in FIGS. 4, 5, and 6, the molding machine 2 includes a metal mold 20 (see FIGS. 4 and 5) that forms a retention portion-molding space 202 to which a melt resin can be supplied, a resin supplying device 2A (resin supply means: see FIGS. 4 to 6) configured to supply the melt resin into the retention portion-molding space 202 (see FIGS. 13 and 14), and a control unit 2B (resin supply control means: see FIG. 6) configured to control the supply of the melt resin.

The resin supplying device 2A employs a plunger method, and, as shown in FIG. 6, includes a cylinder 2A0, a material input opening 2A1 through which a resin material that becomes the melt resin is poured inside the cylinder 2A0, a plunger 2A2 for aping pressure and extruding the melt resin within the cylinder 2A0, a drive mechanism 2A3 configured to drive the plunger 2A2, a thermoplasticizing unit (melting unit) 2A4 configured to generate heat such that the resin material within the cylinder 2A0 melts, and an operation unit 2A5 configured to accept a predetermined resin supplying operation for supplying the melt resin. The drive mechanism 2A3 has a servomotor that becomes the drive source, and a mechanism for converting a rotational output thereof into a pressure application motion (extruding motion) of the plunger 2A2. A weighed resin material within the cylinder 2A0 is extruded by the plunger 2A2 in a melted state, and is ejected from a nozzle 2A6.

The control unit 2B (control means) is a microcomputer known in the art, and, when the resin supplying operation is performed on the operation unit 2A5 of the resin supplying device 2A, drives the thermoplasticizing unit 2A4 and the drive mechanism 2A3 of the resin supplying device 2A to supply the weighed resin material within the cylinder 2A0 into the retention portion-molding space 202 as the melt resin.

Next, the metal mold 20 will be described. As shown in FIGS. 4 and 5, the metal mold 20 has a movable mold 20X, a fixed mold 20Y, a first slide mold 20Z, and a second slide mold 20W, and, when those are positioned and combined as guide pins 29A and 29B are inserted through guide holes 28A and 28B, the metal mold 20 is closed and forms the retention portion-molding space 202 therein (see FIGS. 13 and 14). The fixed mold 20Y is disposed in a state of being positioned such that the fixed mold 20Y does not move with respect to a predetermined structure such as, for example, a table (e.g., a state of being fixed with respect to the predetermined structure). On the other hand, the movable mold 20X is integrated with the resin supplying device (resin supply means) 2A and is a handy type mold that is provided with a holding portion (also referred to as a handle portion) 2A9 that is to be held by a hand.

The resin supplying device 2A has the operation unit 2A5 for externally supplying the melt resin. As shown in FIG. 6, the operation unit 2A5 is connected to the control unit 2B, and the control unit then a predetermined resin supplying operation is performed on the operation unit 2A5 by a user, drives the resin supplying device 2A (the thermoplasticizing unit 2A4 and the drive mechanism 2A3) such that external supplying of the melt resin is executed.

The operation unit 2A5 is provided at a position enabling operation by a hand of a user holding the holding portion 2A9 of the movable mold 20X. Specifically, as shown in FIGS. 4 and 5, the operation unit 2A5 here is a push button provided at the top of the columnar holding portion 2A9. Thus, the movable mold 20X of this embodiment can be regarded as a handgun type resin supplying device having the holding portion 2A9, and the resin supplying device (resin supply means) 2A including the operation unit 2A5. With this, the resin supplying operation of the melt resin can be performed easily. However, the operation unit 2A5 can be provided at a position enabling operation by the other hand not holding the holding portion 2A9, or can be provided separately from the movable mold 20X.

Figure 11:
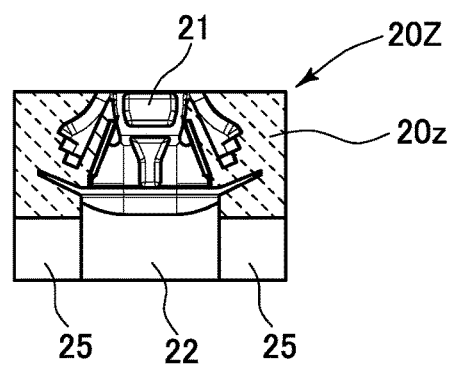
FIG. 11 shows a surface that belongs to the first slide mold disposed on the upper surface of the fixed mold in the manufacturing device in FIG. 4 and that is to be joined with the second slide mold.
Figure 12:
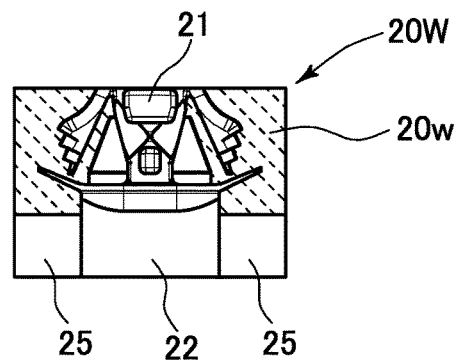
FIG. 12 shows a surface that belongs to the second slide mold disposed on the upper surface of the fixed mold in the manufacturing device in FIG. 4 and that is to be joined with the first slide mold.
Figure 13:
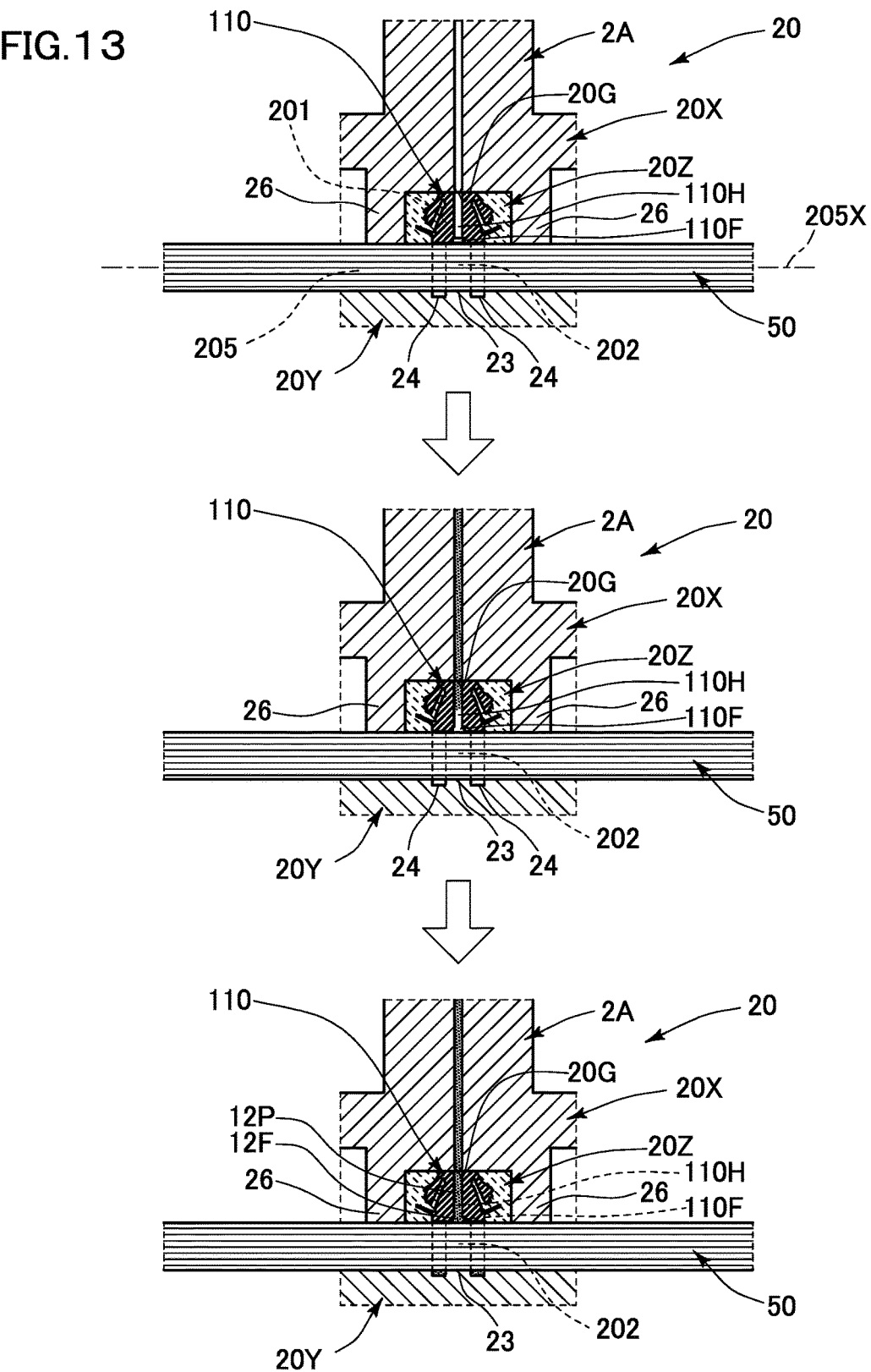
FIG. 13 shows, by using a cross sectional view obtained by cutting, in direction C, the metal mold in the mold-closed state in FIG. 5, a loading process of melt resin into the metal mold.

The metal mold 20 has the retention portion-molding space 202 (see FIGS. 13 and 14) for molding the retention component 10 in the mold-closed state. Although FIG. 13 shows, as a hatching area marked with solid lines, one cut surface obtained by cutting the metal mold 20 in FIG. 5 in direction C, the hatching area marked with dashed lines is not a cut surface but shows a joining surface 20z (see FIG. 11) of the first slide mold 20Z with respect to the second slide mold 20W. It should be noted that, since the other cut surface (i.e., a cross section of the metal mold 20 on a side where a joining surface 20w (see FIG. 12) of the second slide mold 20W with respect to the first slide mold 20z appears) on the opposite side of the cut surface in FIG. 13 is similar to that in FIG. 13 although being slightly different, diagrammatic representation of that is omitted.

Figure 7:
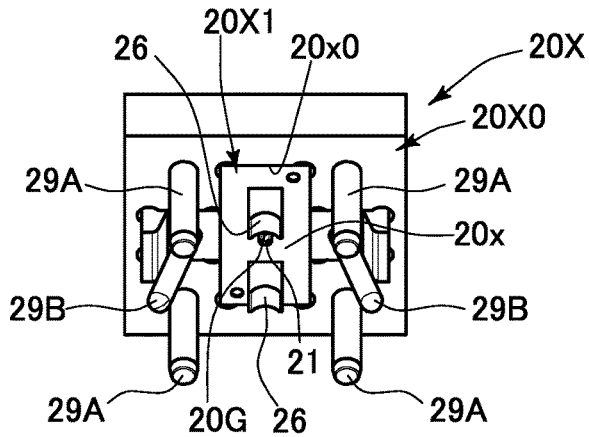
FIG. 7 is a perspective view showing a lower surface of a movable mold located on the upper side in the manufacturing device in FIG. 4.
Figure 8:
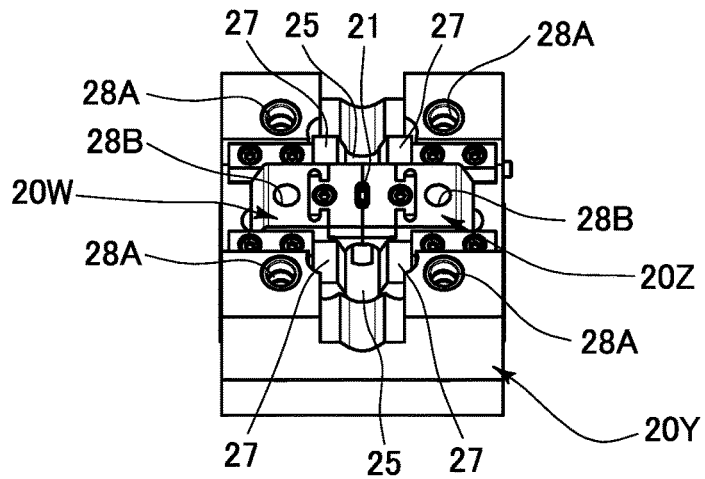
FIG. 8 is a perspective view showing an upper surface of a fixed mold located on the lower side in the manufacturing device in FIG. 4, and first and second slide molds disposed thereabove.
Figure 9:
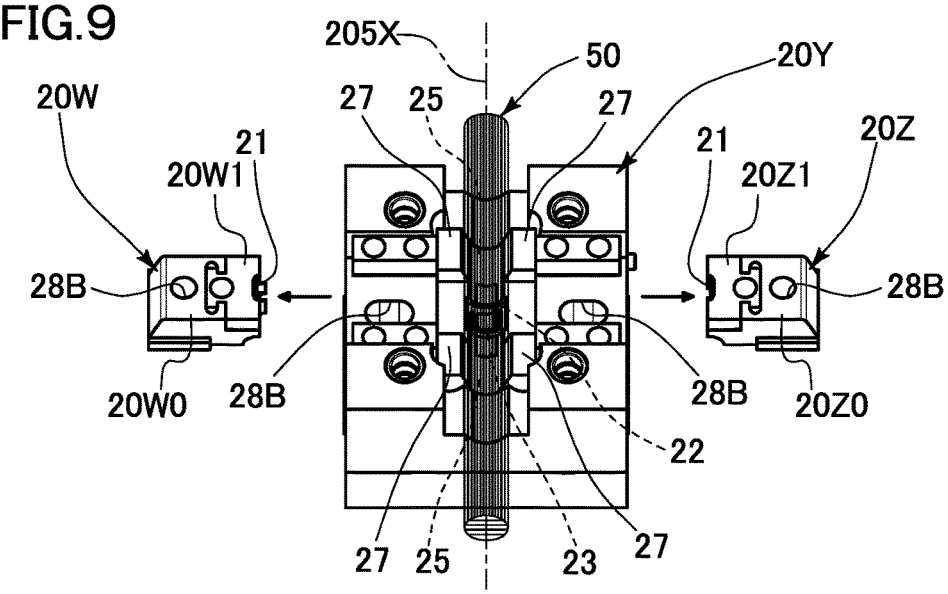
FIG. 9 is a perspective view showing a state in which the wiring bundle is disposed on the fixed mold in the manufacturing device in FIG. 4.

As shown in FIGS. 7 to 9, the metal mold 20 has a penetration hole-forming concavity 25 for forming a penetration hole 205 (which can be referred to also as a wiring bundle disposition hole; see FIG. 13) through which the wiring bundle 50 is penetratingly disposed, and a retention portion-forming concavity 22 for forming, as a molding space, the retention portion-molding space 202 (see FIGS. 13 and 14) surrounding the outer circumference of the wiring bundle 50 penetratingly disposed at an intermediate section of the penetration hole 205. The metal mold 20 further has an engagement portion-accommodating concavity 21 for forming an engagement portion-accommodating space (which can be referred to also as an insert part-accommodating space; see FIGS. 13 and 14) 201 to enable disposition of the previously-prepared insert part 110, which is to become the engagement portion 11, the engagement portion-accommodating space 201 being connected to the retention portion-molding space 202, which is columnar, and arranged outside of the outer circumference of the retention portion-molding space 202. The concavities 21, 22, and 25 respectively form the corresponding spaces 201, 202, and 205 (see FIGS. 13 and 14) in the mold-closed state of the metal mold 20. As a result, a molding space made up of the retention portion-molding space 202 and the penetration hole 110H of the insert part 110 disposed in the engagement portion-accommodating space 201, with the retention portion-molding space 202 and the penetration hole 110H being connected to each other, is formed in the metal mold 20.

Figure 10:
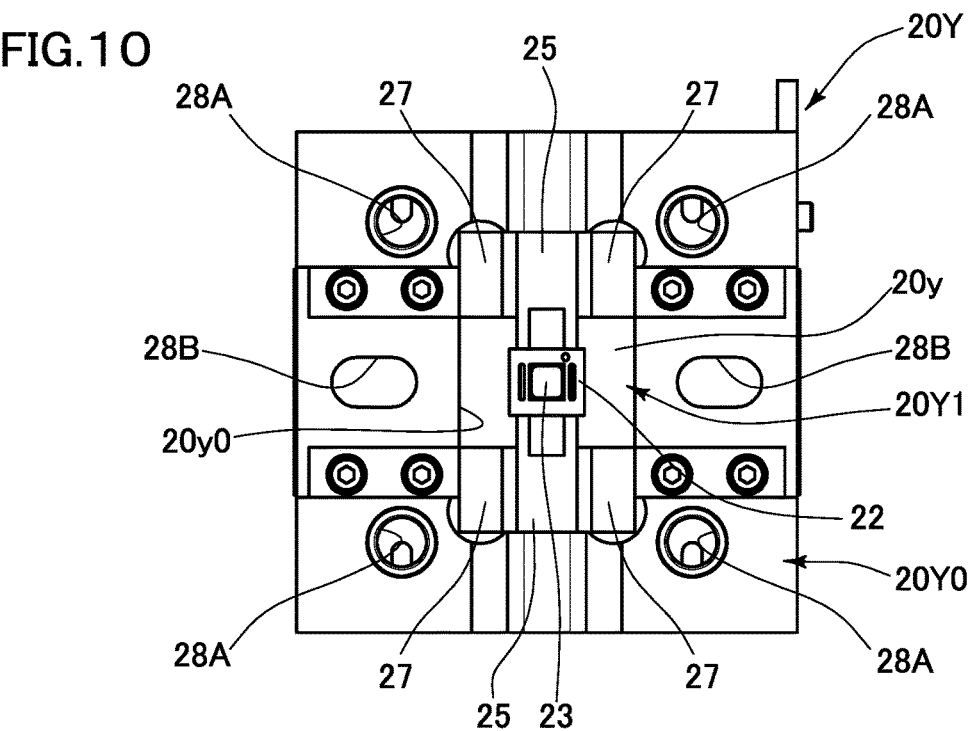
FIG. 10 shows the upper surface of the fixed mold in the manufacturing device in FIG. 4.

As shown in FIG. 10, a concavity 20y0 is formed on an upper surface 20y of a main body portion 20Y0 of the fixed mold 20Y, and a separate molded article-forming portion (a so-called insert) 20Y1 is fitted in the concavity 20y0. On the molded article-forming portion 20Y1, the penetration hole-forming concavity 25 that forms the lower side of the penetration hole 205, the retention portion-forming concavity 22 that forms the lower side of the retention portion-molding space 202, and a pinching portion 27 are formed.

As shown in FIG. 9, in the first and second slide molds 20Z and 20W, molded article-forming portions 20Z1 and 20W1 having respective joining surfaces (contact surfaces: see FIGS. 11 and 12) 20z and 20w are fitted with respect to main body portions 20Z0 and 20W0. On the molded article-forming portions (i.e., so-called inserts) 20Z1 and 20W1, the penetration hole-forming concavity 25, which forms the upper side of the penetration hole 205, the retention portion-forming concavity 22, which forms the upper side of the retention portion-molding space 202, and the engagement portion-accommodating concavity 21, in which a lower portion of the engagement portion-accommodating space 201 is arranged, are formed.

As shown in FIG. 7, in the movable mold 20X, a concavity 20x0 is formed on a lower surface 20x of a main body portion 20X0, and a separate molded article-forming portion (i.e., an insert) 20X1 is fitted in the concavity 20x0. On the molded article-forming portion 20X1, the engagement portion-accommodating concavity 21, in which an upper portion of the engagement portion-accommodating space 201 is arranged, is formed. Furthermore, a pressing portion 26 for pressing, from above with a pressure generated when the mold is closed, the wiring bundle 50 that is disposed in the penetration hole-forming concavity 25 of the fixed mold 20Y and is sandwiched by the pinching portion 27 is formed on the molded article-forming portion 20X1.

The retention portion-molding space 202 is formed by the above-described molded article-forming portions 20Y1, 20Z1, and 20W1.

Figure 14:
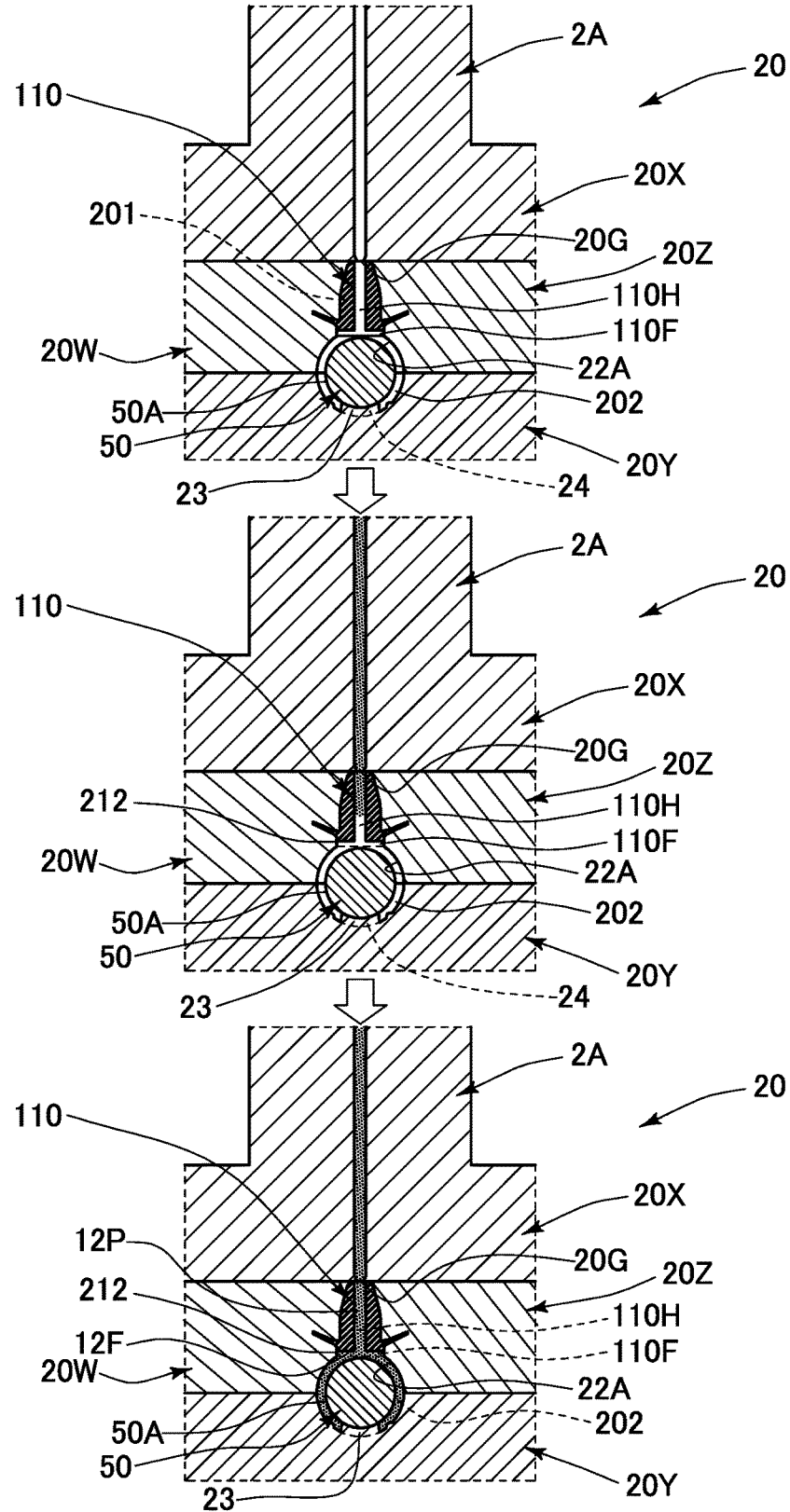
FIG. 14 shows, by using a cross sectional view obtained by cutting, in direction D, the metal mold in the mold-closed state in FIG. 5, a state in which the melt resin is loaded into the metal mold.

In addition, the metal mold 20 has, in the engagement portion-accommodating space 201, an inflow opening (i.e., a so-called gate) 20G through which the melt resin is poured, as shown in FIGS. 13 and 14. Furthermore, the inflow opening 20G is provided in the engagement portion-accommodating space 201 at the most distal position from a communicatively connecting portion 212 (see FIG. 14) that becomes the boundary for the retention portion-molding space 202.

The engagement portion-accommodating space 201 is a space in which the previously-prepared insert part 110, which is to become the engagement portion 11, is to be disposed. As shown in the top diagrams of FIGS. 13 and 14, in the penetration hole 110H of the insert part 110 disposed in the engagement portion-accommodating space 201, the inflow opening (i.e., the gate) 20G is located in an opening on the top end surface 11a side of the shaft portion 11A. Then, the penetration hole 110H forms a passage through which the resin flows from the inflow opening 20G to the retention portion-molding space 202. That is, as shown in the middle diagrams of FIGS. 13 and 14, the melt resin flows into the penetration hole 110H first through the inflow opening (i.e., the gate) 20G. Then, as shown in the bottom diagrams of FIGS. 13 and 14, after flowing into the penetration hole 110H, the melt resin flows into the retention portion-molding space 202, which is connected to an outlet of the penetration hole 110H. More specifically, after flowing into the penetration hole 110H, the melt resin first enters into the groove portion 110F, and flows into the retention portion-molding space 202 while spreading in the longitudinal direction of the groove portion 110F. The groove portion 110F smoothens the inflow of the melt resin from the penetration hole 110H into the retention portion-molding space 202.

Meanwhile, the metal mold 20 has a hole-forming portion 23 in the retention portion-molding space 202. The hole-forming portion 23 is arranged to make contact with the outer circumferential surface 50A of the wiring bundle 50 penetratingly disposed in the penetration hole 205 in the retention portion-molding space 202, and forms a hole portion 12H (see FIG. 2) that penetrates the molded annular retention portion 12 in an inward/outward direction (i.e., a radial direction).

As shown in FIGS. 13 and 14, the hole-forming portion 23 is provided on the opposite side of the engagement portion-accommodating space 201 (also, the inflow opening 20G) in the retention portion-molding space 202. The hole-forming portion 23 is provided at a position that is exact opposite to the inflow opening 20G in the engagement portion-accommodating space 201. When the melt resin is poured in from the inflow opening 20G, the wiring bundle 50 is pushed toward the opposite side of the inflow opening 20G by the pressure of the melt resin. By having the hole-forming portion 23, the wiring bundle 50 is retained at the center position (central portion) of the annular retention portion-molding space 202 in a manner in which the wiring bundle 50 is placed on the hole-forming portion 23, whereby the annular retention portion-molding space 202 is obtained and the retention portion 12 can be molded annularly with certainty. Thus, in this embodiment, the hole-forming portion 23 functions as a central position retention means of this invention.

On an inner circumferential wall surface 22A of the retention portion-forming concavity 22 that forms the retention portion-molding space 202 (in other words, the inner circumferential wall surface 22A, located at the outer circumference of the retention portion-molding space 202, of the metal mold 20: see FIG. 14); the hole-forming portion 23 is formed as a protruding portion that protrudes inward within the annular retention portion-molding space 202 from the inner circumferential wall surface 22A on the opposite side of the inflow opening 20G.

On the other hand, the retention portion-molding space 202 has groove portions 24 that extend out in the circumferential direction, and that form a pair on both-end sides of the hole-forming portion 23 in a penetration direction 205X of the penetration hole 205 (see FIG. 13) at a segment where the hole-forming portion 23 is located in the circumferential direction of the retention portion-molding space 202. By having the groove portions 24, the retention portion-molding space 202 forms an annularly continuous space that avoids the formation area of the hole-forming portion 23.

The hole-forming portion 23 and the groove portions 24 may also be formed on the inflow opening 20G side of the retention portion-molding space 202. In this case, the wiring bundle 50 penetratingly disposed in the penetration hole 205 is retained at the center position within the penetration hole 205 in a manner of being contacted by the hole-forming portions 23 located above and below (central position retention means).

As shown in FIGS. 8 and 9, the metal mold 20 has, on the fixed mold 20Y, the pinching portion 27 that sandwiches the wiring bundle 50 disposed in the penetration hole-forming concavity 25 (penetration hole 205). The pinching portion 27 functions as a temporary disposition portion configured to temporary dispose each of the wiring members 5 of the wiring bundle 50 disposed in the penetration hole-forming concavity 25 so as to be closely adhered to each other and not to be scattered, and also functions as a positioning portion configured to position the disposed wiring bundle 50 so as to pass through the center of the annular retention portion-molding space 202. The pinching portion 27 of this embodiment is located on both-end sides of the retention portion-molding space 202 in the penetration direction 205X of the penetration hole 205, and sandwiches, from both of those sides, and positions the wiring bundle 50. The pinching portion 27 is formed so as to opposingly protrude toward the movable mold 20K side (upward) from the upper surface 20y (see FIG. 10) of the fixed mold 20Y located below, and to sandwich the wiring bundle 50 disposed in the penetration hole 205.

When the retention component 10 and the wire harness 1 in which the wiring bundle 50 is tied and retained by the retention component 10 are manufactured, the metal mold 20 is used, and first as shown in FIG. 9, on the fixed mold 20Y with the wiring bundle 50 penetratingly disposed in the penetration hole-forming concavity 25, which becomes the penetration hole 205, the slide molds 20W and 20Z are disposed (see FIG. 8), and additionally the movable mold 20X is disposed. At this time, the insert part 110, which is to become the engagement portion 11, is disposed in the engagement portion-accommodating concavity 21 of one of the slide molds 20W and 20Z. Then, through the guide holes 28B, of the slide molds 20W and 20Z, penetratingly formed from inside above to outside below with respect to the slide molds 20W and 20Z; the guide pins 29B extending similarly from inside above to outside below of the movable mold 20X are inserted to bring closer the movable mold 20X and the fixed mold 20Y. With this, the slide molds 20W and 20Z approach each other while sliding on the fixed mold 20Y, and the metal mold 20 is closed as shown in FIG. 5. As a result, the engagement portion-accommodating concavities 21 of the slide molds 20W and 20Z together form the engagement portion-accommodating space 201. At this time, the insert part 110 is placed in the engagement portion-accommodating space 201.

Next, the melt resin is poured into the retention portion-molding space 202 from the engagement portion-accommodating space 201 side by the resin supplying device 2A (see FIG. 13). That, is, the melt resin is caused to flow from the gate 20G into the retention portion-molding space 202 through the penetration hole 110H of the insert part 110, which is to become the engagement portion 11, and the groove portion 110F. Then, the poured melt resin is solidified through cooling. As a result, the retention portion 12 having the core portion 12P, the groove filling portion 12F, and the annular portion 12R is molded. Then, the metal mold 20 is opened, and the wiring bundle 50 and the retention component 10 are taken out. With this, the retention component 10 having the engagement portion 11 and the retention portion 12 being closely adhered to the outer circumferential surface 50A of the wiring bundle 50 are obtained, and, furthermore, the wire harness 1 having the wiring bundle 50 and the retention component 10 is obtained. When opening the metal mold 20 by separating the movable mold 20X from the fixed mold 20Y, the slide molds 20W and 20Z are separated from each other while sliding on the fixed mold 20Y.

Note that the resin material of the insert part 110, which is to become the engagement portion 11, and the resin material of the retention portion 12 are the same. Accordingly, the resin materials of the insert part 110 and the retention portion 12 are unified as a result of being solidified through cooling. Thus, the engagement portion 11 and the retention portion 12 together form the retention component 10 in one piece.

As described above, according to this embodiment, the insert part 110, which is to become the engagement portion 11, is prepared beforehand, and the retention portion 12 is molded so as to be integral with the insert part 110. This allows the engagement portion 11 to have a complicated shape. In addition, the molding of the retention portion 12 and the tying of the wiring bundle 50 can be achieved simultaneously, eliminating the need for a worker to perform a conventional tying operation by hands, and a significant improvement in working efficiency can be achieved.

Moreover, according to this embodiment, insert parts 110 which are to become engagement portions 11 having a variety of shapes, and, further, first and second slide molds 20H and 20Z (and movable molds 20X in some cases) which are capable of having such insert parts 110 arranged inside thereof may be prepared to make it possible to manufacture wire harnesses 1 having the engagement portions 11 having the variety of shapes with appropriate replacement of the first and second slide molds 20W and 20Z (and the movable molds 20X in some cases) on the upper side. Here, the fixed mold 20Y on the lower side can be used in common for those first and second slide molds 20W and 20Z (and the movable molds 20X in some cases), and this provides improved efficiency.

Although the first embodiment of this invention has been described above, the embodiment, is merely illustrative, this invention is not limited to the embodiment, and various modifications such as additions and omissions may be made based on the knowledge of a person skilled in the art without departing from the scope of the claims.

In the following, modifications and other embodiments different from the embodiment described above will be described. It should be noted that portions having the same functions as those in the above-described embodiment are designated by the same reference characters and the detailed description thereof is omitted. In addition, the above-described embodiment and the following examples may be combined to be implemented as appropriate as long as no technical contradiction arises.

In the embodiment described above, as long as the retention portion 12 of the retention component 10 is closely adhered to the outer circumferential surface 50A of the wiring bundle 50, the retention component 10 may be integrally fixed or not fixed is the closely adhered state with respect to the outer circumferential surface 50A of the wiring bundle 50.

Although the hole-forming portion 23 is formed as a protruding portion in the embodiment described above, instead of the protruding portion, the hole-forming portion 23 may be a molded article-forming portion (so-called an insert) that is separate from the retention portion-forming concavity 22 and that is detachably fitted with respect to the inner circumferential wall surface 22A of the retention portion-forming concavity 22. In this case, by forming a concavity for causing the molded article-forming portion to engage and be fitted on the inner circumferential wall surface 22A, the molded article-forming portion can be positioned and disposed.

In addition, as a method of not using the hole-forming portion 23, there is a method of setting the width of the retention portion-molding space 202 in an extending direction (i.e., the penetration direction 205X) of the wiring bundle 50 penetratingly disposed in the penetration hole 205, to be equal to or smaller than twice the diameter of a circular cross-section of one of the wiring members 5 forming the wiring bundle 50. With this, the annular retention portion-molding space 202 can be obtained with certainty since the width of the annular retention portion-molding space 202 is small and the wiring members 5 cannot enter therein even when being bent. In addition, reducing the width of the annular molding retention portion-molding space 202 results in a small width of the molded retention portion 12 and contributes to reducing the amount of the material used.

In the following, modifications of this invention will be described.

In the case with the configuration of the embodiment described above, when the wiring bundle 50 disposed in the penetration hole 205 is subjected to a large pressure during, for example, pouring of the melt resin, the wiring bundle 50 may be pushed out from the central position of the annular retention portion-molding space 202 to possibly make contact with the inner circumferential wall surface 22A that forms the retention portion-molding space 202. In this case, the retention portion-molding space 202 cannot be obtained, and the annular retention portion 12 that was supposed to be molded becomes interrupted at the part where the contact is made and may be molded in a non-annular shape. At the retention portion 12 not molded annularly, there is a possibility of not being able to tie and retain the wiring bundle 50.

As a response, in this invention, a central position retention means, configured to retain the wiring bundle 50 disposed in the penetration hole 205 such that the wiring bundle 50 passes through the central portion of the annular retention portion-molding space 202, is provided to the metal mold 20.

Figure 15:
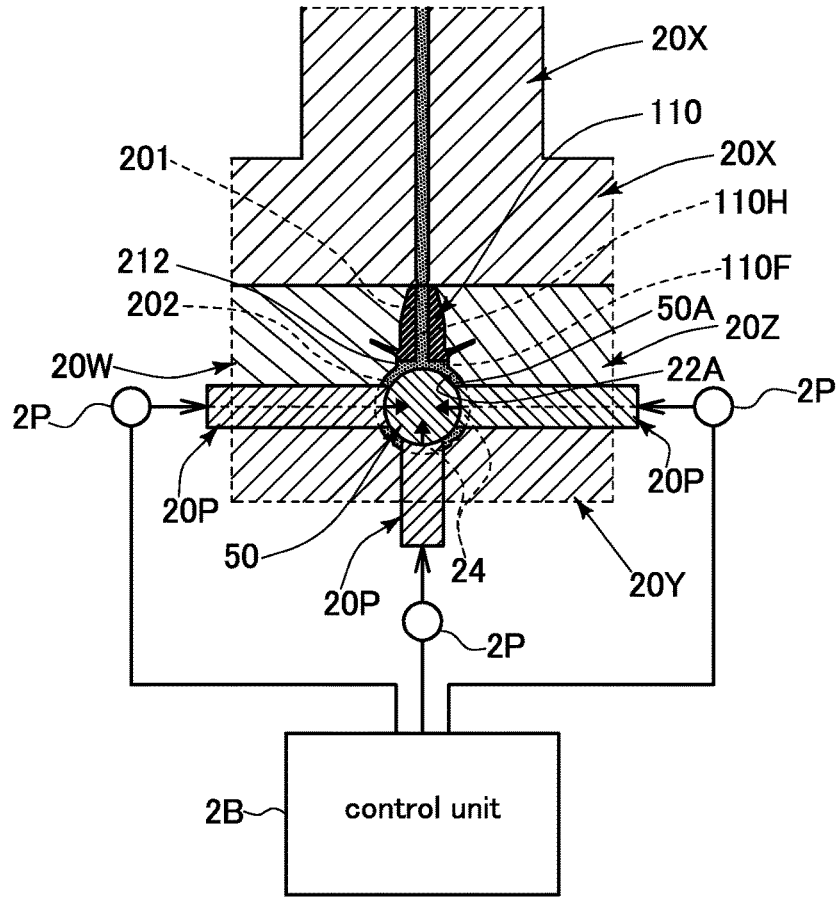
FIG. 15 is for describing a first example of a first modification of this invention by using the same cross section as in FIG. 14.

In a first modification of this invention, as shown in FIG. 15, employed as the central position retention means is a configuration including a first pressing means configured to press the outer circumferential surface 50A of the wiring bundle 50 disposed in the penetration hole 205 from multiple directions after at least the metal mold 20 is closed in the embodiment described above. The first pressing means of this modification is provided with pressing members 20P configured to press the outer circumferential surface 50A of the wiring bundle 50 disposed in the penetration hole 205, and a control unit (pressing control means) 2B configured to switch between a pressed state of retaining the pressing members 20P to cause the wiring bundle 50 to pass through the central portion of the annular retention portion-molding space 202 and a non-pressed state of not pressing. With this modification, since the wiring bundle 50 disposed within the penetration hole 205 can be positioned and retained at the central portion of the retention portion-molding space 202 by the pressing members 20P with certainty, the annular retention portion 12 can be molded with certainty.

A plurality of the pressing members 20P are pried around the outer circumference of the wiring bundle 50 disposed in the penetration hole 205, and can each move forward and backward to/from the wiring bundle 50. Among the pressing members 20P, there is one that is configured to press the wiring bundle 50 disposed in the penetration hole 205 from an immediate underneath position toward the center direction of the wiring bundle 50, and the control unit 2B actuates a pressing member-driving portion 2P (e.g., a motor) serving as a source for generating the pressing force to move the pressing members 20P forward and backward in up-down direction.

The source for generating the pressing force is not limited to an electromotive drive source as the pressing member-driving portion 2P (e.g., a motor or the like) as described above, and oil pressure, air pressure, an urging member (e.g., a spring or the like) may be used. When an urging member is used, the pressing force acts immediately in association with closing of the metal mold 20.

In addition, the pressing members 20P of this modification are disposed in a quantity of more than one. Thus, other than the one that is configured to press the wiring bundle 50 disposed in the penetration hole 205 from the immediate underneath position toward the center, the pressing members 20P of this modification also include those that press the wiring bundle 50 toward the center from other positions, and, when those are operated by the pressing member-driving portion (e.g., a motor) 25 driven and controlled by the control unit 2B, the wiring bundle 50 can be retained at the center.

Figure 16:
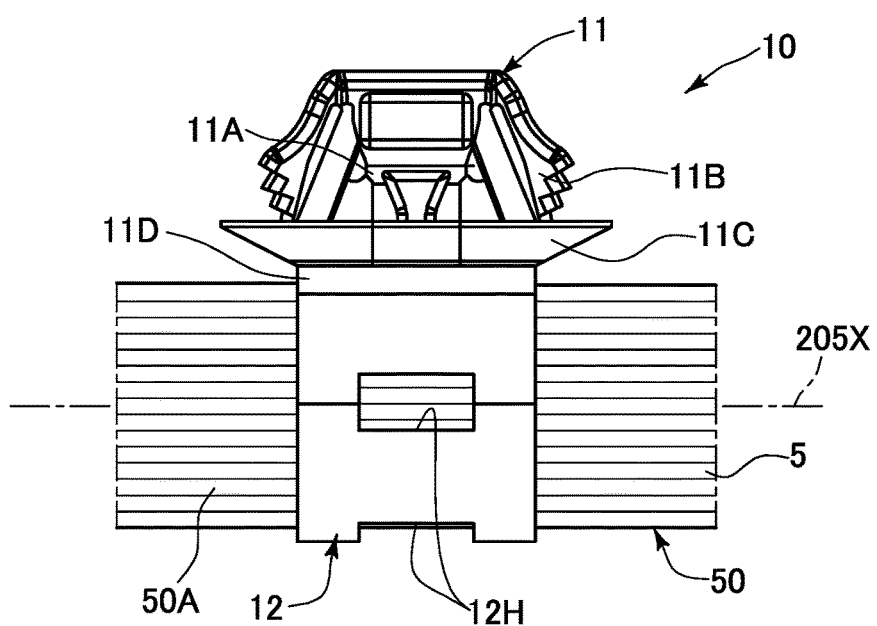
FIG. 16 is a front view of the wire harness molded by the metal mold in FIG. 15.

In this modification, since molding of the resin is conducted in a state where leading ends of the pressing members 20P are in contact with the wiring bundle 50, the leading ends function similarly to the hole-forming portion 23 in the embodiment described above, and, on the molded retention portion 12, the hole portion 12H penetrating inward/outward direction is formed by the pressing members 20P (see FIG. 16). Similarly to the embodiment described above, since the retention portion-molding space 202 of the metal mold 20 is connected in the circumferential direction at both-end sides of the leading ends of the pressing members 20P in the penetration direction 205X, the annular shape is obtained.

Figure 17:
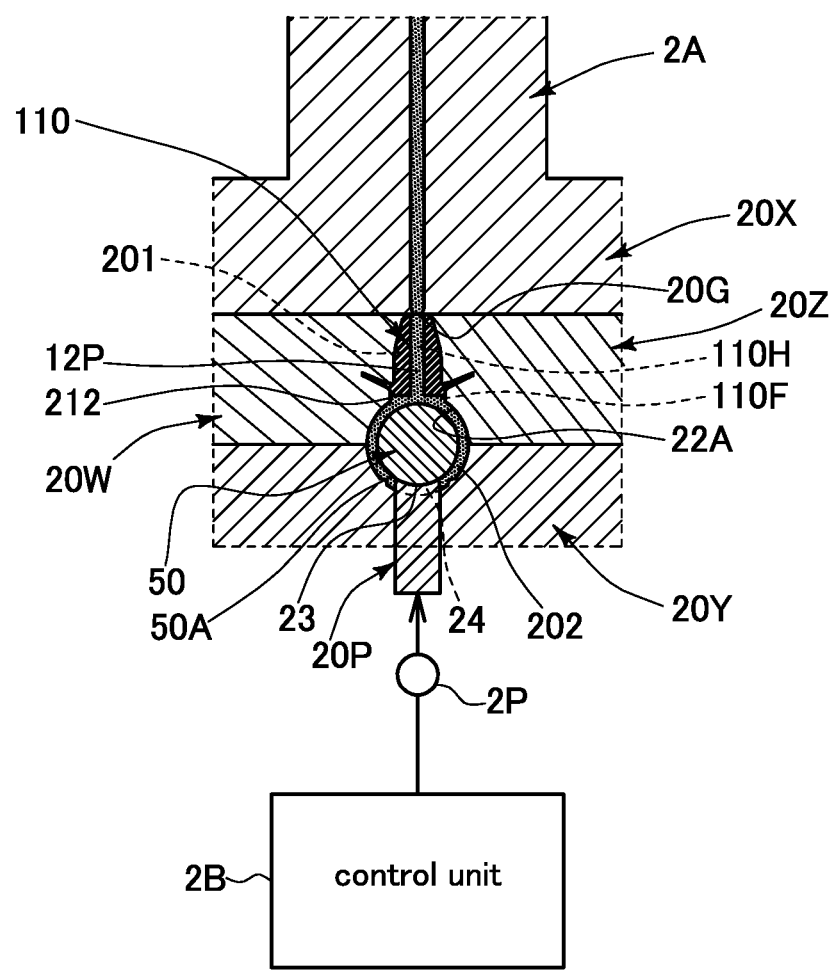
FIG. 17 is for describing a second example of the modification in FIG. 15 by using the same cross section as in FIG. 14.

Furthermore, as shown in FIG. 15, in the first modification, although a configuration is employed in which the pressing members 20P configured to press the outer circumferential surface 50A of the wiring bundle 50 from multiple directions are provided as the central position retention means (first pressing means); having at least a pressing member 20P configured to press the outer circumferential surface 50A of the wiring bundle 50 from an opposite side (here, from below) of the communicatively connecting portion 212 between the retention portion-molding space 202 and the engagement portion-accommodating space 201 is sufficient as shown in FIG. 17. Since pressure of the melt resin entering into the retention portion-molding space 202 from upper above can be countered from below by having the pressing member 20P configured to press from below, the wiring bundle 50 can be prevented from being bent and can be retained at the central position within the retention portion-molding space 202.

Figure 18:
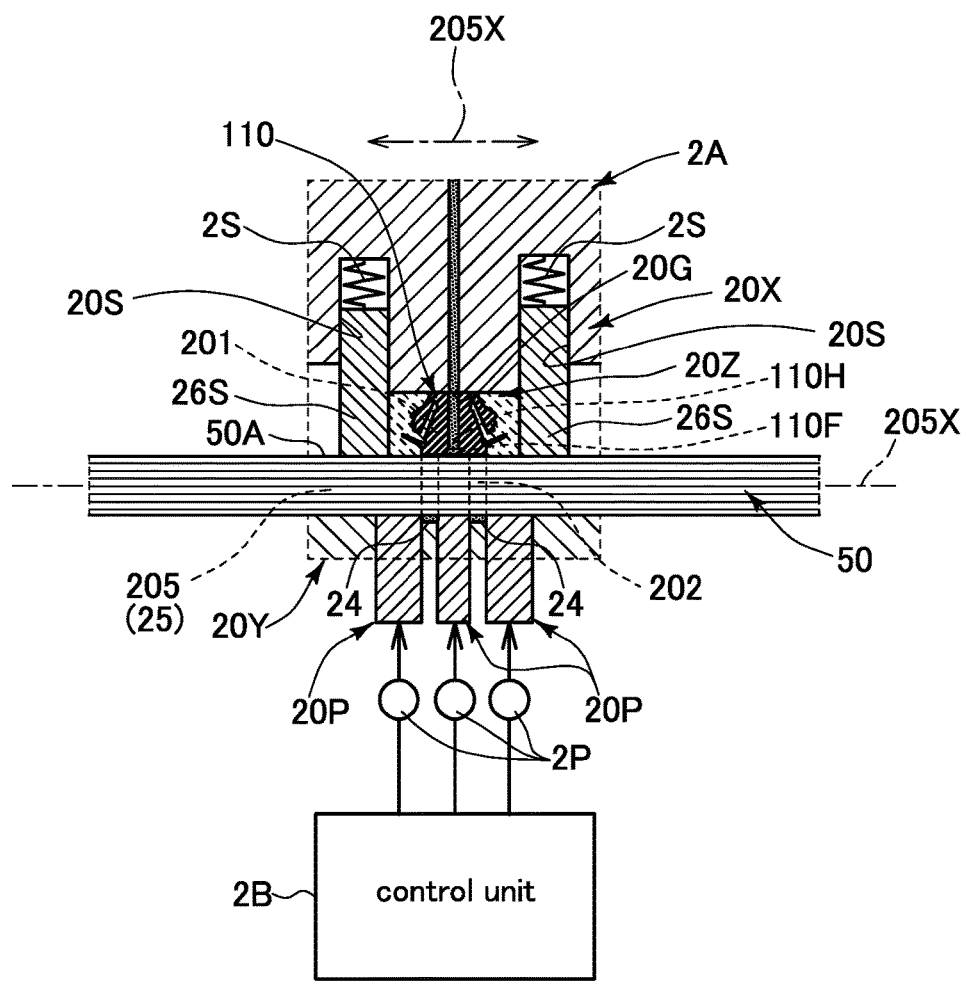
FIG. 18 is for describing a third example of the modification in FIG. 15 by using the same cross section as in FIG. 13.

Furthermore, as shown in FIG. 15, in the first modification, although a configuration is employed in which the pressing members 20P configured to press, in a form of an insert penetrating the retention portion-molding space 202, the outer circumferential surface 50A of the wiring bundle 50 are provided as the central position retention means (first pressing means); a pressing member 20P configured to press the outer circumferential surface 50A of the wiring bundle 50 in a form not penetrating the retention portion-molding space 202 may be added as shown in FIG. 18. Furthermore, a configuration obtained by modifying the first modification such that the pressing members 20P are configured to apply pressure in a form not penetrating the retention portion-molding space 202 may be used. In the case in FIG. 18, the pressing member 20P penetrating the retention portion-molding space 202, and the pressing members 20P and 20P located on both sides of the wiring bundle 50 in the long side direction, are included.

Figure 19:
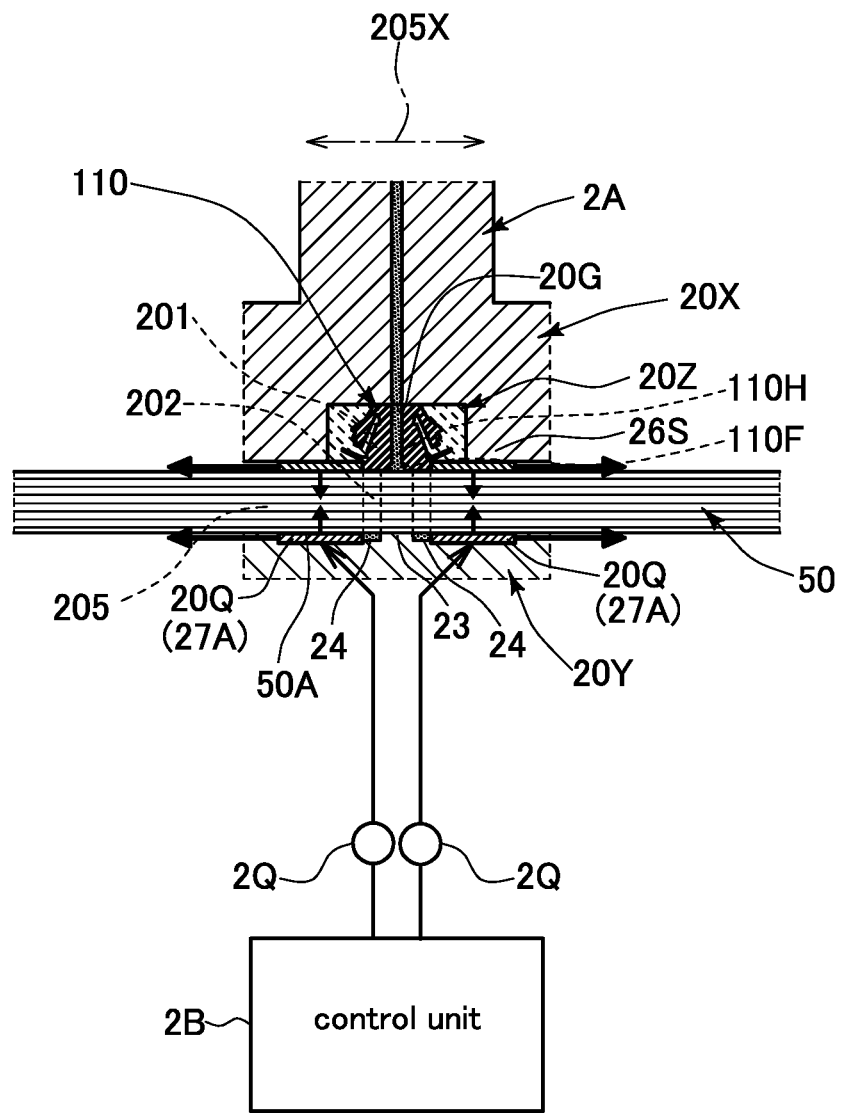
FIG. 19 is for describing a second modification of this invention by using the same cross section as in FIG. 13.

Furthermore, as shown in FIG. 19, in a second modification of this invention, a configuration is employed including, as the central position retention means, pulling means configured to pull the wiring bundle 50, from both-end sides in the length direction 205X thereof (in other words, penetration direction of the penetration hole 205), disposed in the penetration hole 205, after the metal mold 20 is closed in the embodiment described above. The pulling means of the second modification include pulling members 20Q configured to pull the wiring bundle 50 such that the wiring bundle 50 passes through the central portion of the annular retention portion-molding space 202, and a control unit (pull control means) 2B configured to switch between an unpulled state of not pulling and a pulled state of pulling and linearly retaining the wiring bundle 50 by the pulling members 20Q. Also in this modification, since the wiring bundle 50 disposed within the penetration hole 205 is positioned and retained at the central portion of the retention portion-molding space 202 by the pulling members 20Q, the annular retention portion 12 without any interruptions can be molded with certainty.

The pulling members 20Q include, for example, pinching portions 27A and 27A on both sides of the retention portion-forming concavity 22. The pinching portions 27A and 27A function as clamping portions configured to clamp and retain the wiring bundle 50. The control unit 2B actuates drive mechanisms 2Q including, for example, motors as drive sources to retain the wiring bundle 50 as being clamped by the pinching portions 27A and 27A, and can, in the clamped state, operate the pinching portions 27A and 27A so as to be separated from each other. The respective drive mechanisms 2Q transfer driving force (here, rotational output) of not-shown drive sources to the pinching portions 27A and 27A via gear mechanisms that are known in the art and are also not shown, and converts the driving force into separating motion force and clamping force of the pinching portions 27A and 27A.

It should be noted that the source for generating pulling force to separate the pinching portions 27A and 27A is not limited to the electromotive drive source as the motors described above, and oil pressure, air pressure, and the like may be used.

Furthermore, in this invention, a configuration may be employed including a biting prevention means configured to prevent biting of the wiring bundle 50 when closing the first slide mold (first opposing mold) 20Z and the second slide mold (second opposing mold) 20W. In the previously-described embodiments, at the time of closing the metal mold 20, the first and second slide molds 20Z and 20W approach each other so as to sandwich the wiring bundle 50 from a first side and a second side opposite thereof, and make contact with each other around the wiring bundle 50 to be closed. However, a problem arises at the time of contact, regarding the wiring bundle 50 being bitten by the first and second slide molds 20Z and 20W. By having the biting prevention means, biting that occurs at this time can be prevented.

In the first modification of this invention shown in FIG. 18, employed as the biting prevention means is a configuration including a second pressing means configured to press the outer circumferential surface 50A of the wiring bundle 50 from sides where the first and second slide molds 20Z and 20W make contact. The second pressing means is a configuration provided with pressing members 26S configured to press the outer circumferential surface 50A of the wiring bundle 50 from the sides where the first and second slide molds 20Z and 20W make contact. According to this modification, since the wiring bundle 50 disposed within the penetration hole 205 is pressed by the pressing members 26S so as not to come close to where the first and second slide molds 20Z and 20W make contact, there is no concern of biting of the wiring bundle 50.

Although the pressing members 26S correspond to the pressing portion 26 (see FIG. 7) that protrudes downward from the movable mold 20X in the embodiment described above, the pressing members 26S of this embodiment are members separate from the movable mold 20X and are housed in a downward protruded state within pressing member-housing portions 20S having openings downward of the movable mold 20X. Urging members (here, springs) 2S are disposed on the rear side of the pressing members 26S opposite to the front end surfaces that press the wiring bundle 50. When the movable mold 20X approaches the fixed mold 20Y at the time of closing the metal mold 20, the pressing members 26S make contact with the outer circumferential surface 50A of the wiring bundle 50 from above, and are pushed within the pressing member-housing portions 20S while resisting urging force of the urging members 2S as the approach proceeds. When closing of the metal mold 20 is completed, the pressing members 26S are retained in a state where the center surfaces thereof are pressed against the outer circumferential surface 50A of the wiring bundle 50 by the urging force of the urging members 2S.

It should be noted that the source for generating the pressing force is not limited to the urging members 2S (springs), and electromotion, oil pressure, air pressure, and the like may be used.

In addition, the pressing of the wiring bundle 50 by the pressing members 26S as the biting prevention means is suffice when being conducted at least when closing the metal mold 20. However, in FIG. 18, since the source for generating the pressing force is the urging means 2S (springs), the pressing continues until the metal mold 20 is opened. Thus, even when the melt resin is poured in after the metal mold 20 is closed, the wiring bundle 50 disposed in the penetration hole 205 is pressed downward.

Another modification of this invention is a configuration in which the metal mold 20 is provided with, on both-end sides sandwiching the retention portion-molding space 202 in the penetration hole 205, resin leakage suppression means configured to prevent or suppress leakage of the melt resin in a long side direction 205X of the wiring bundle 50 penetratingly disposed in the penetration hole 205.

Figure 20:
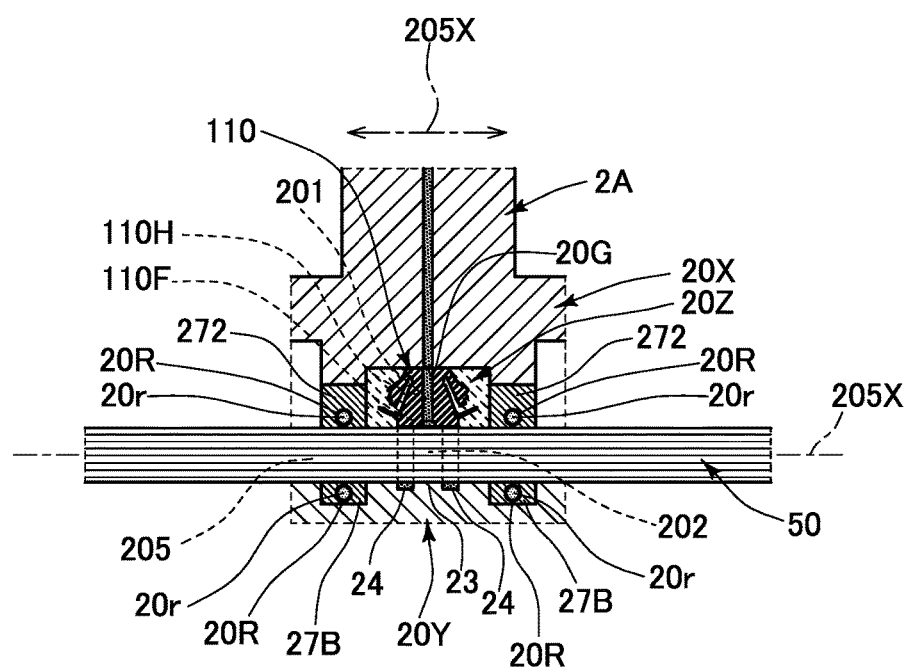
FIG. 20 is for describing a third modification of this invention by using the same cross section as in FIG. 13.

In this third modification, as shown in FIG. 20, a configuration is employed as the resin leakage suppression means, including cooling means configured to cool the both-end sides sandwiching the retention portion-molding space 202 (retention portion-forming concavity 22) in the penetration hole 205 (penetration hole-forming concavity 25) when the melt resin is supplied within the retention portion-molding space 202 after the metal mold 20 is closed. Since the wiring bundle 50 is a bundle of the wiring members 5, the outer circumferential surface 50A of the wiring bundle 50 has multiple grooves in the long side direction. Thus, the melt resin that has spread throughout the retention portion-molding space 202 may spread in the long side direction (penetration direction 205X) of the wiring bundle 50 via the grooves, and may leak outside the retention portion-molding space 202. According to this modification, the melt resin that leaks outside the retention portion-molding space 202 can be solidified through cooling before leaking out. Furthermore, since a portion that leaks outside the retention portion-molding space 202 is the first to solidify through cooling, the portion solidified through cooling become a wall to prevent leakage of the melt resin that follows.

In this case, as the cooling means, for example, cooling inserts that function as cooling units disposed within the metal mold can be used. By cooling these inserts, leakage of the melt resin can be prevented. Specifically, pinching portions 27B and 27B configured to pinch sides on the outer circumference of the wiring bundle 50 disposed in the penetration hole 205 may be used as the cooling inserts from both sides of the retention portion-forming concavity 22, and a refrigerant 20r such as cooling water may be passed within refrigerant passages 20R formed inside the pinching portions 27B and 27B. In this case, by forming the pinching portions 27B and 27B with inserts made of a material having fine thermal conductivity such as beryllium copper, the cooling effect can be increased. In addition, supply of the refrigerant 20r within the refrigerant passages 20R may be controlled by the control unit 2B. It should be noted that, a material having fine thermal conductivity here refers to a material having a thermal conductivity of stainless steel or better, and is furthermore preferably a material having a thermal conductivity of 25.5 W/m·° C.

In this invention, as the resin leakage suppression means, a configuration can be employed in which an elastic member such as rubber or the like that annularly surrounds the wiring bundle 50 can be disposed so as to be adjacent to both sides of the retention portion-molding space 202 in the penetration direction. 205X. When this elastic member is disposed so as to surround and press the outer circumferential surface 50A of the wiring bundle 50 penetratingly disposed in the penetration hole 205, the elastic member having elasticity adheres closely to, and fills the gaps of the rugged outer circumferential surface 50A of the wiring bundle 50. As a result, side leakage (more specifically, leakage in the penetration direction 205X) of the melt resin loaded in the retention portion-molding space 202 can be prevented, and formation of an excess-thickness portion by the resin leaked from the side can be suppressed.

Furthermore, in this invention, it is possible to employ, as the resin leakage suppression means, a configuration including a third pressing means configured to press the outer circumferential surface 50A of the wiring bundle 50 disposed in the penetration hole 205 from the opposite side of the communicatively connecting portion 212 between the retention portion-molding space 202 and the engagement portion-accommodating space 201, after at least the metal mold 20 is closed. One conceivable cause of side leakage (leakage in the penetration direction 205X) of the resin is a situation in which the upper side of the wiring bundle 50 is pushed downward by the pressure of the melt resin to cause a gap on the upper side, resulting in side leakage occurring through the gap. Thus, when the wiring bundle 50 disposed in the penetration hole 205 is pressed toward the communicatively connecting portion 212 from the opposite side of the communicatively connecting portion 212 between the retention portion-molding space 202 and the engagement portion-accommodating space 201; formation of such a gap can be prevented and side leakage of the resin can be prevented.

It should be noted that the third pressing means can be used as the previously-described first pressing means shown in FIGS. 15, 17, and 18. More specifically, the configuration of pressing the outer circumferential surface 50A of the wiring bundle 50 upward from below by the pressing members 200 can be also utilized as the resin leakage suppression means.

It should be noted that, in the previously-described modification in FIG. 18, the pressing members 26S forming the second pressing means press the wiring bundle 50 disposed in the penetration hole-forming concavity 25 of the fixed mold 20Y forming the lower side of the penetration hole 205, downward from above on both sides sandwiching the first and second slide molds 20Z and 20W that are closed. Since the pressing members 26S press the wiring bundle 50 downward also when the melt resin is poured in after the metal mold is closed, even if the melt resin leaks out from the first and second slide molds 20Z and 20W in the long side direction 205X of the wiring bundle 50, the pressing members 26S can prevent further spillage of the resin outside. Thus, the pressing members 26S forming the second pressing means can also function as the resin leakage suppression means.

Figure 21:
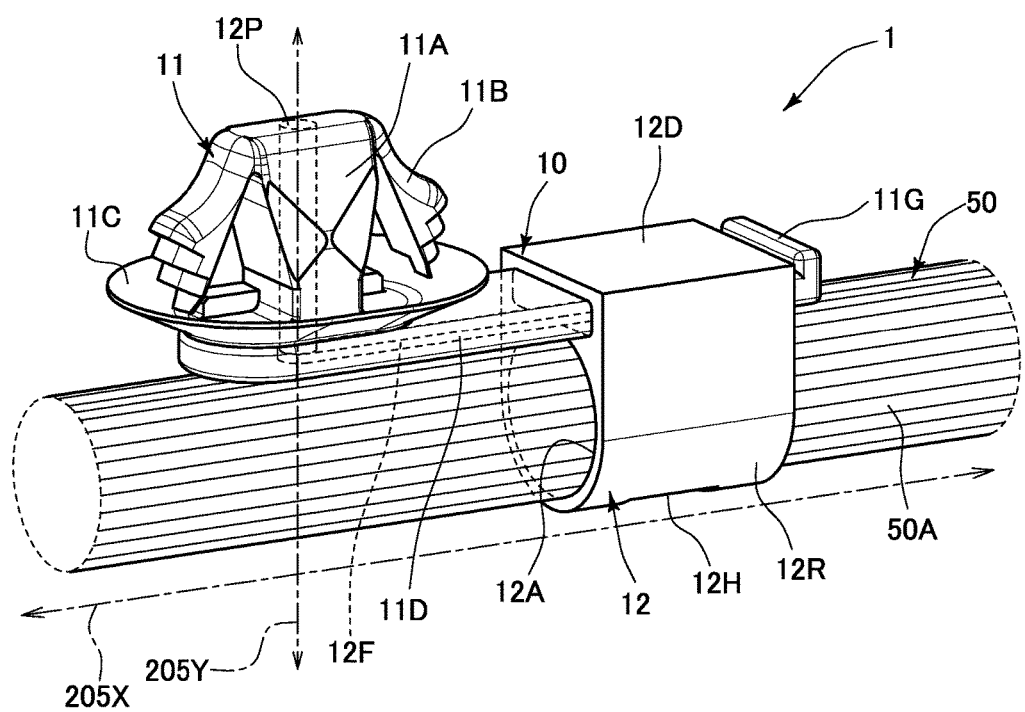
FIG. 21 is a perspective view of a wire harness according to a fourth modification of this invention.
Figure 22A:
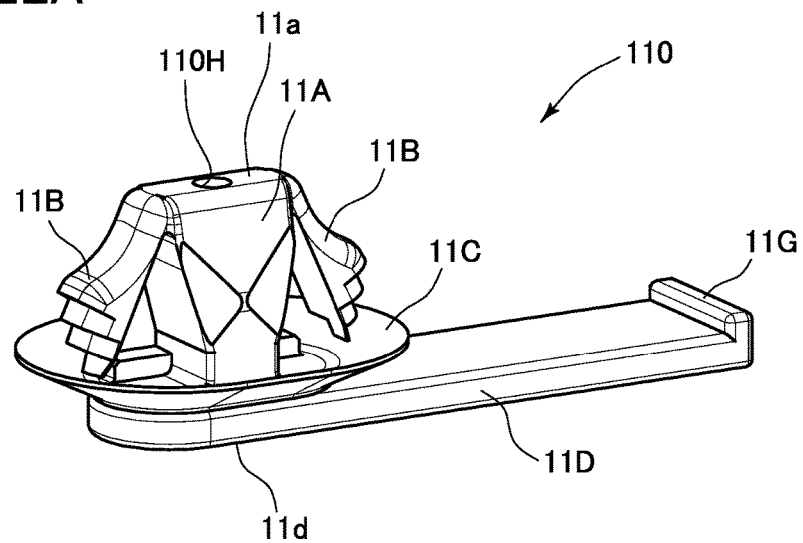
FIG. 22A is a perspective view of an insert part which is to become an engagement portion of the wire harness shown in FIG. 21 when viewed from a first direction.
Figure 22B:
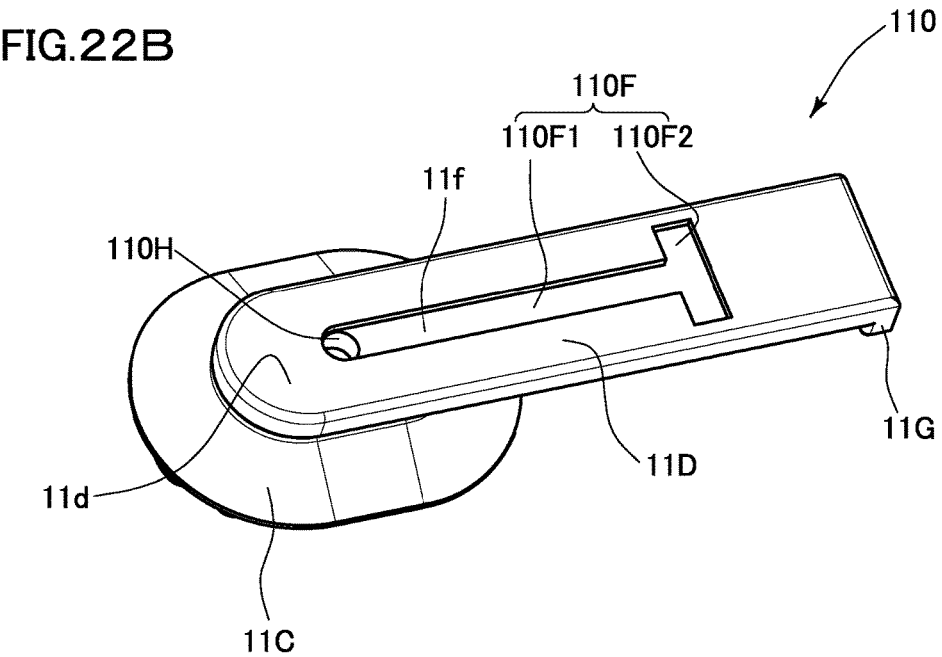
FIG. 22B is a perspective view of the insert part which is to become the engagement portion of the wire harness shown in FIG. 21 when viewed from a second direction different from the first direction of FIG. 22A.
Figure 25:
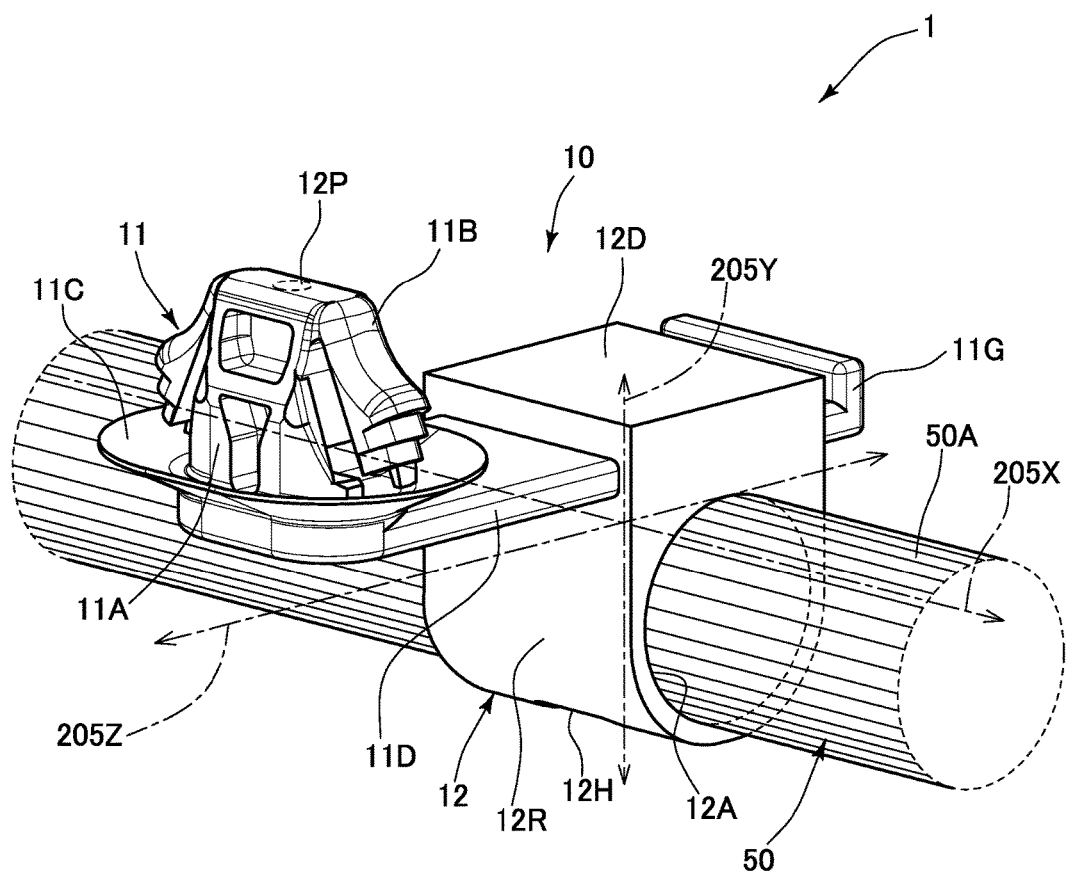
FIG. 25 is a perspective view of a wire harness according to a fifth modification of this invention.
Figure 26A:
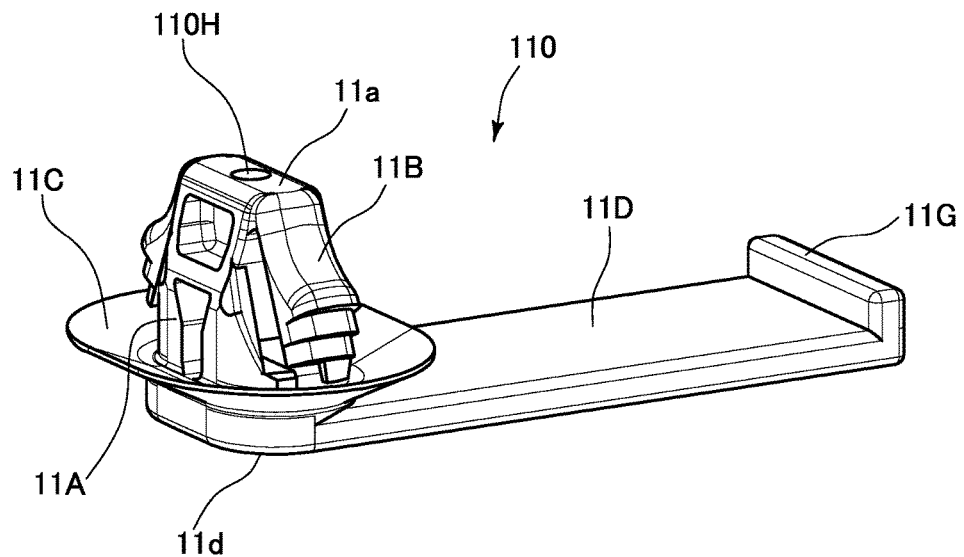
FIG. 26A is a perspective view of an insert part which is to become an engagement portion of the wire harness shown in FIG. 25 when viewed from a first direction.
Figure 26B:
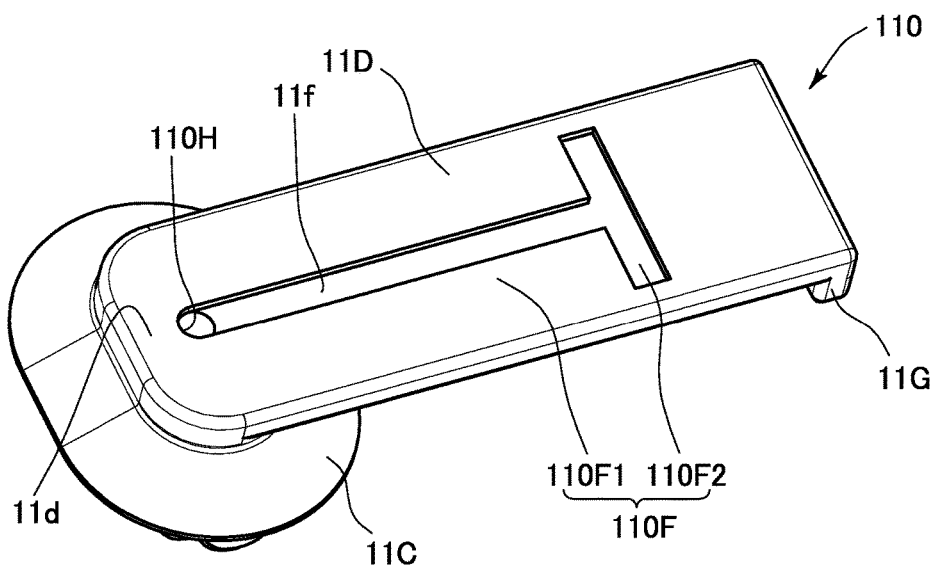
FIG. 26B is a perspective view of the insert part which is to become the engagement portion of the wire harness shown in FIG. 25 when viewed from a second direction different from the first direction of FIG. 26A.
Figure 28:
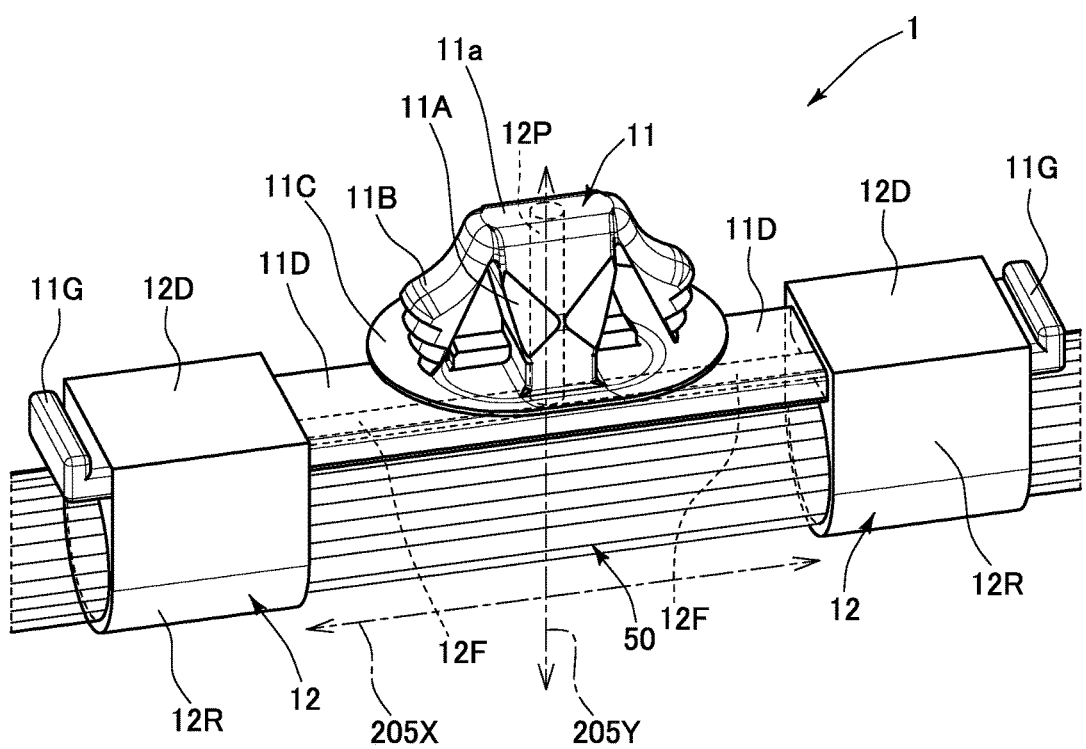
FIG. 28 is a perspective view of a wire harness according to a sixth modification of this invention.
Figure 29A:
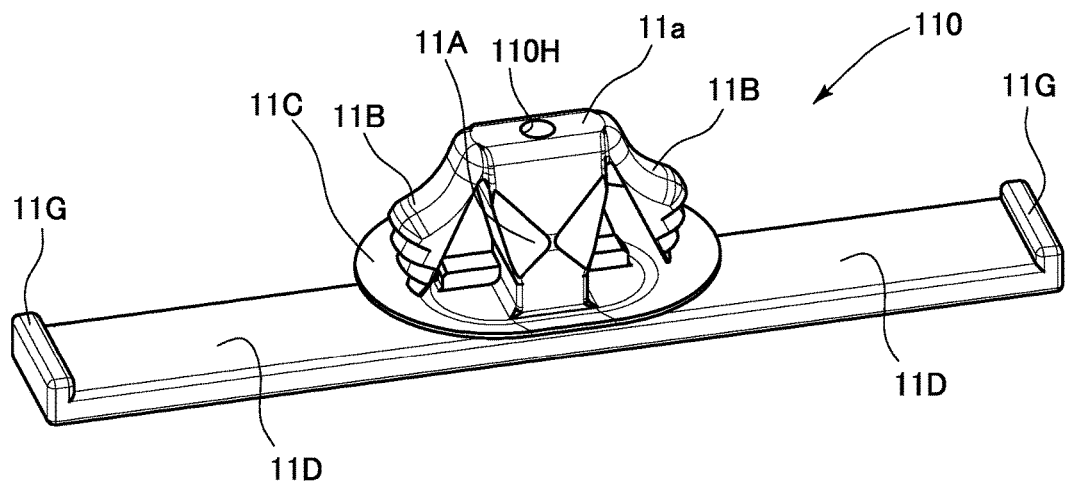
FIG. 29A is a perspective view of an insert part which is to become an engagement portion of the wire harness shown in FIG. 28 when viewed from a first direction.
Figure 29B:
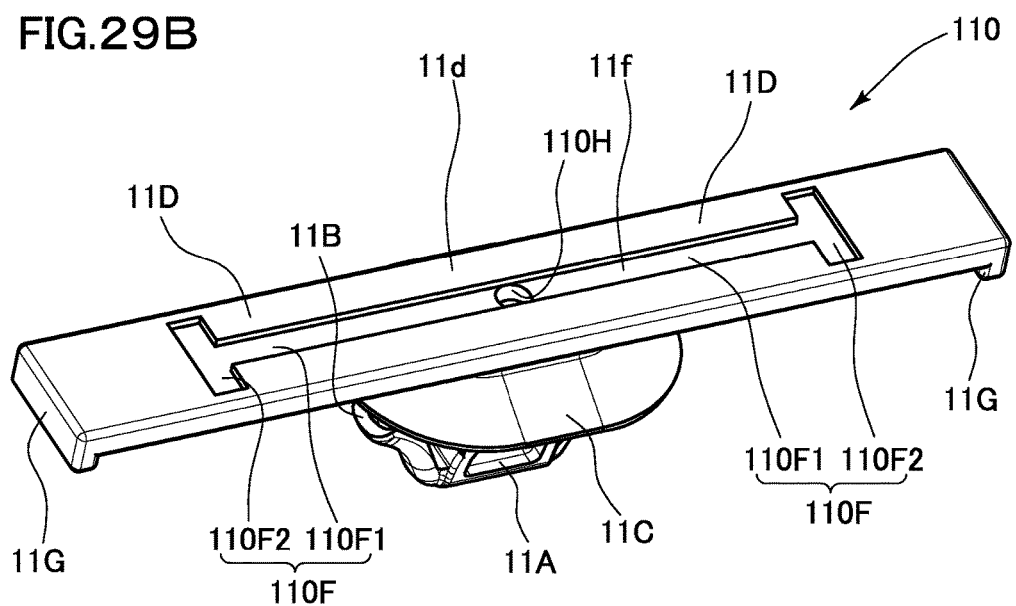
FIG. 29B is a perspective view of the insert part which is to become the engagement portion of the wire harness shown in FIG. 28 when viewed from a second direction different from the first direction of FIG. 29A.

In each of fourth, fifth, and sixth modifications of this invention, for the purpose of disposing the engagement portion 11 at a position further away from the retention portion 12 in the retention component 10 and the wire harness 1, a connecting portion 11D is formed as an extension portion (which can be referred to also as an arm portion) that extends in a direction perpendicular to the axial direction of the shaft portion 11A as shown in FIGS. 21, 25, and 28. In addition, the retention portion 12 has a connecting portion 12D joined and connected to the connecting portion 11D on an extension top side (i.e., a side away from the shaft portion 11A of the connecting portion 11D.

In the case of the retention component 10 according to the fourth modification shown in FIG. 21, the connecting portion 11D of the engagement portion 11 forms a one-way arm portion extending from an annular outer circumferential portion of the retention portion 12 in the extending direction 205X of the wiring bundle 50 retained by the retention portion 12. Meanwhile, the shaft portion 11A of the engagement portion 11 has an axis extending in a direction 205Y in which the connecting portion 11D and the wiring bundle 50 are arranged (here, further, in a direction perpendicular to the long side direction 205X of the wiring bundle 50), and extends in a direction away from the retention portion 12.

In the case of the retention component 10 according to the fifth modification shown in FIG. 25, the connecting portion 11D of the engagement portion 11 forms a one-way arm portion extending from an annular outer circumferential portion of the retention portion 12 in a direction 205Z along a tangent to the retention portion 12. Meanwhile, the shaft portion 11A of the engagement portion 11 has, near an extension top of the connecting portion 11D, an axis extending in a direction 205Y perpendicular to both an extending direction 205Z of the connecting portion 11D and the long side direction 205X of the wiring bundle 50, and extends in a direction away from the retention portion 12.

The retention component 10 according to the sixth modification shown in FIG. 28 has two retention portions 12, and two connecting portions 11D of the engagement portion 11 each extends toward a separate one of the retention portions 12, forming a two-way arm portion. In this modification, the two retention portions 12 are arranged in the long side direction 205X of the wiring bundle 50. In addition, the engagement portion 11 is located (here, in a middle position) between the two retention portions 12. Each of the two connecting portions 11D extends from a rear end of the shaft portion 11A in an opposite direction toward a separate one of the retention portions 12. That is, the two connecting portions 11D extend in a straight line.

Also in each of the fourth, fifth, and sixth modifications, the engagement portion 11 including the connecting portion (s) 11D is prepared beforehand as an insert part 110 as shown in FIGS. 22A and 22B, FIGS. 26A and 26B, or FIGS. 29A and 29B, and the retention portion (s) 12 is molded with the insert part 110 disposed in a metal mold 20. The molded retention portion (s) 12 has the connecting portion 12D, which is annular and surrounds an outer circumference of the connecting portion 11D of the insert part 110 (which is to become the engagement portion 11).

The connecting portion 11D of the insert part 110 extends from the shaft portion 11A side, and penetrates the connecting portion 12D of the retention portion 12, and a tip portion 11G of the connecting portion 11D which has penetrated the connecting portion 12D makes contact with the connecting portion 12D of the retention portion 12 on a rear side with respect to a penetration direction of the connecting portion 11D (i.e., on a side facing the shaft portion 11A. Accordingly, the tip portion 11G of the connecting portion 11D functions as a detachment preventing portion to prevent the retention portion 12 from being detached from the connecting portion 11D if the retention portion 12 is not unified with the insert part after being molded. The tip portion 11G forms a bent portion that is bent on a leading end side of the connecting portion 11D.

In addition, similarly to the embodiment described above, the insert part 110 has a penetration hole 110H that penetrates the shaft portion 11A in the axial direction of the shaft portion 11A. The penetration hole 110H penetrates the connecting portion 11D as well, which is located at a rear end part of the shaft portion 11A. In addition, the connecting portion 11D has a groove portion 110F formed in a surface 11d on a side facing away from the shaft portion 11A. The penetration hole 110H is formed so as to pass through the insert part 110 and have an opening in a groove bottom surface 11f of the groove portion 110F. The shape of the groove portion 110F is different from the shape of the groove portion 110F according to the embodiment described above.

The groove portion 110F has a main groove portion 110F1 extending from the position of the penetration hole 110H in the extending direction of the connecting portion 11D, and an end groove portion 110F2 extending on a leading end side thereof in a width direction of the connecting portion 11D (i.e., in a direction perpendicular to both the extending direction of the connecting portion 11D and the extending direction of the shaft portion 11A). The main groove portion 110F1 primarily serves to guide the melt resin flowing from the penetration hole 110H toward the retention portion-molding space 202. Meanwhile, the end groove portion 110F2 is a portion communicatively connected with the retention portion-molding space 202, and serves to efficiently send the melt resin into the retention portion-molding space 202 by increasing the area of connection between the groove portion 110F and the retention portion-molding space 202.

Figure 23:
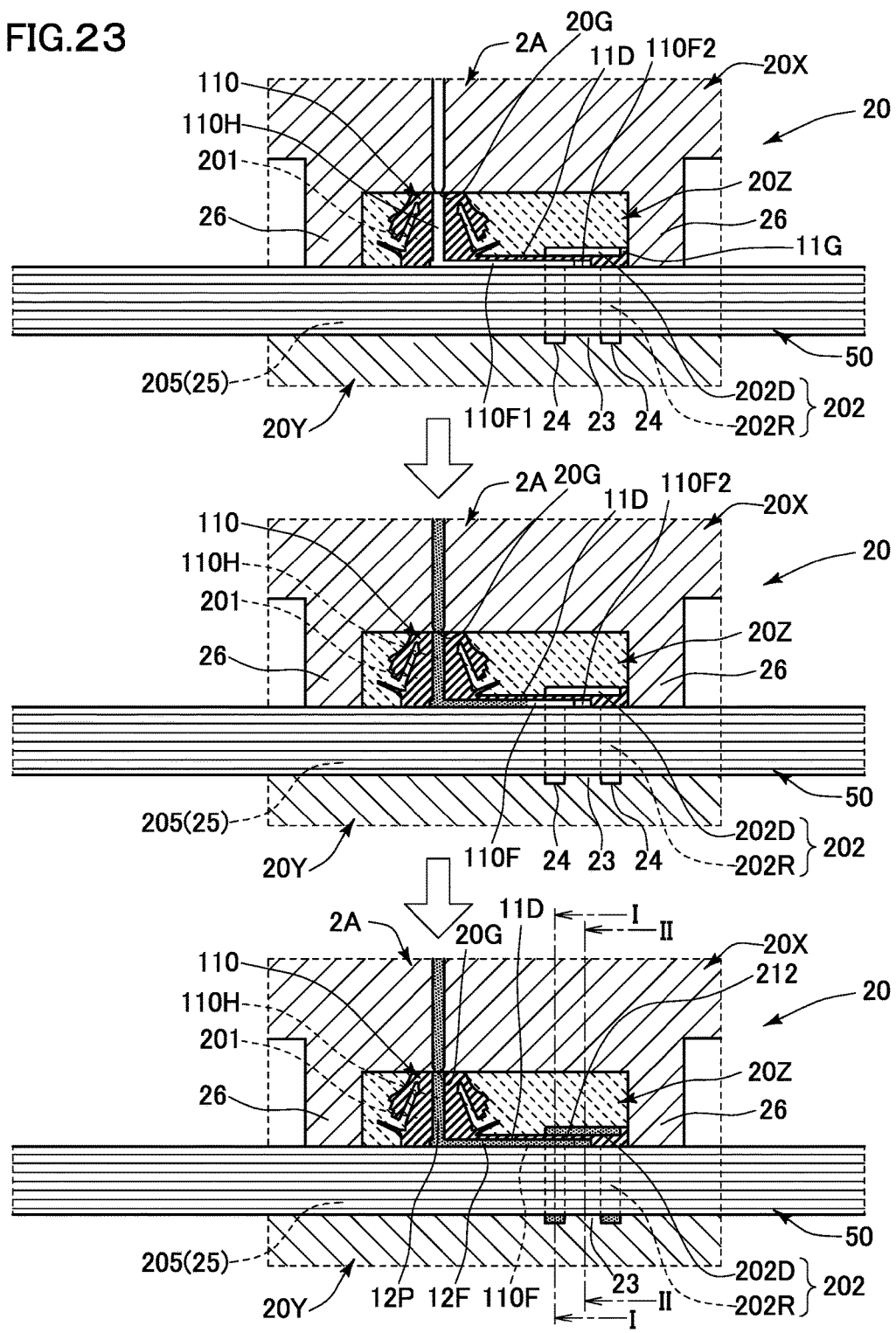
FIG. 23 is a diagram for explaining a process of manufacturing the wire harness shown in FIG. 21 using the same cross section as in FIG. 13.
Figure 27:
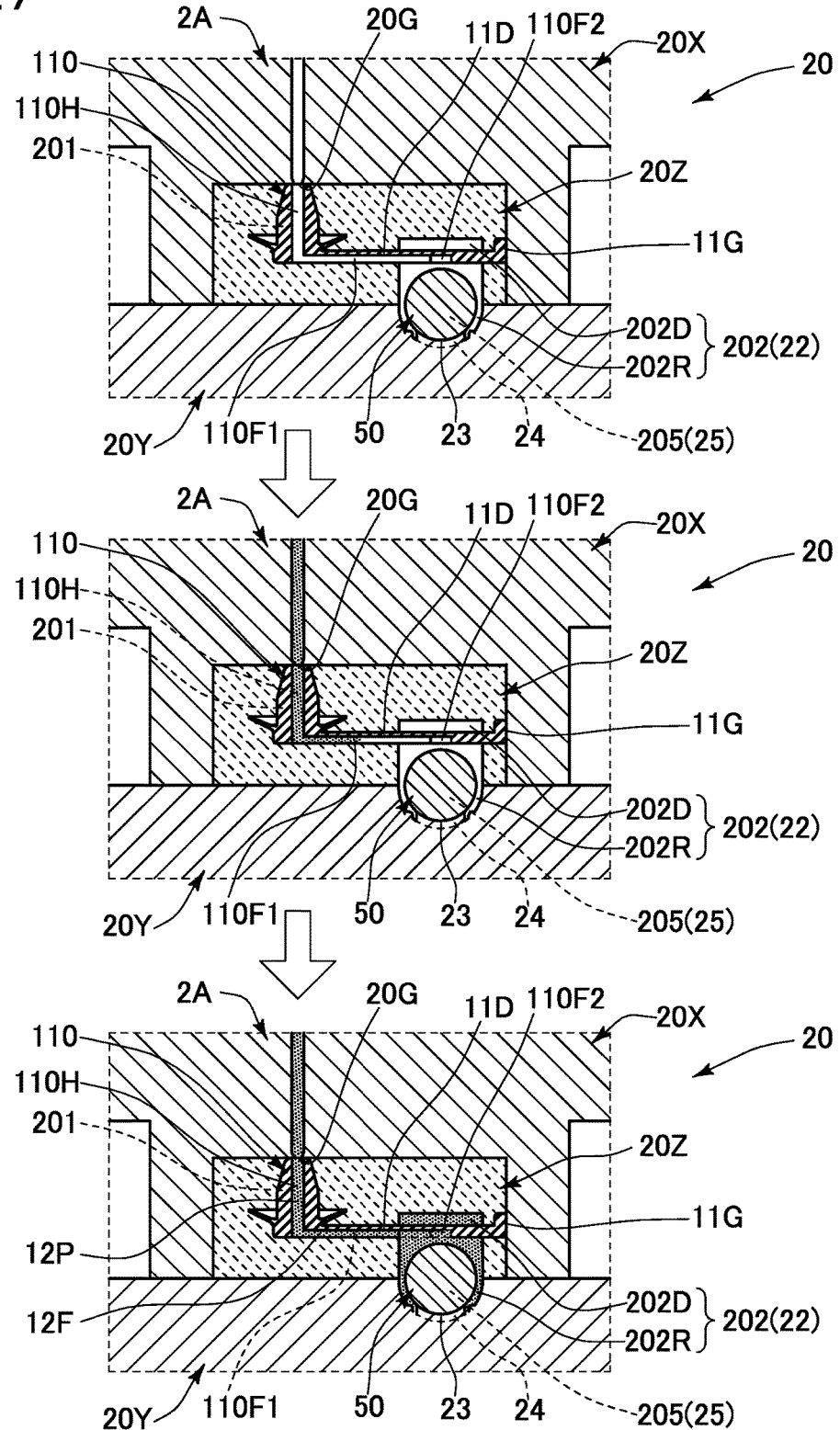
FIG. 27 is a diagram for explaining a process of manufacturing the wire harness shown in FIG. 25 using the same cross section as in FIG. 14.
Figure 30:
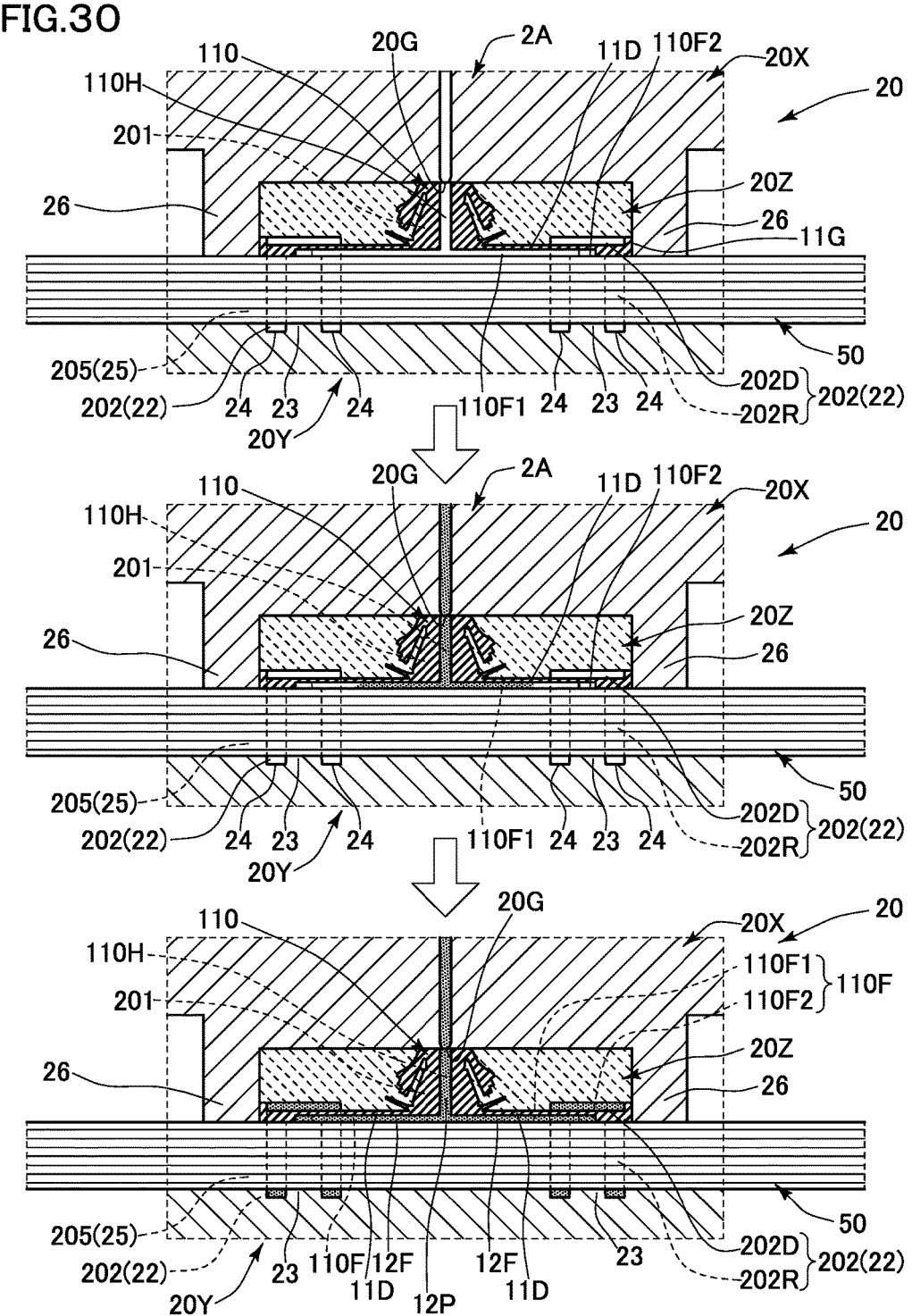
FIG. 30 is a diagram for explaining a process of manufacturing the wire harness shown in FIG. 28 using the same cross section as in FIG. 13.

When the retention components 10 and the wire harnesses 1 according to the fourth, fifth, and sixth modifications are manufactured, metal molds 20 as shown in FIGS. 23, 27, and 30, respectively, can be employed. First, similarly to the embodiment described above, the wiring bundle 50 is disposed in the penetration hole 205, the insert part 110 is disposed in the engagement portion-accommodating space 201, and the metal mold 20 is closed to be in the mold-closed state. Next, the melt resin is poured into the retention portion-molding space 202 from the engagement portion-accommodating space 201 side by the resin supplying device 2A (see FIGS. 23, 27, and 30). That is, the melt resin is caused to flow from the gate 20G into the retention portion-molding space 202 through the penetration hole 110H of the insert part 110, which is to become the engagement portion 11, and the groove portion 110F. Note that, in the case of FIG. 30, the melt resin flowing from the penetration hole 110H separates into the respective groove portions 110F of the two connecting portions 11D, and flows further into the respective retention portion-molding spaces 202.

Figure 24A:
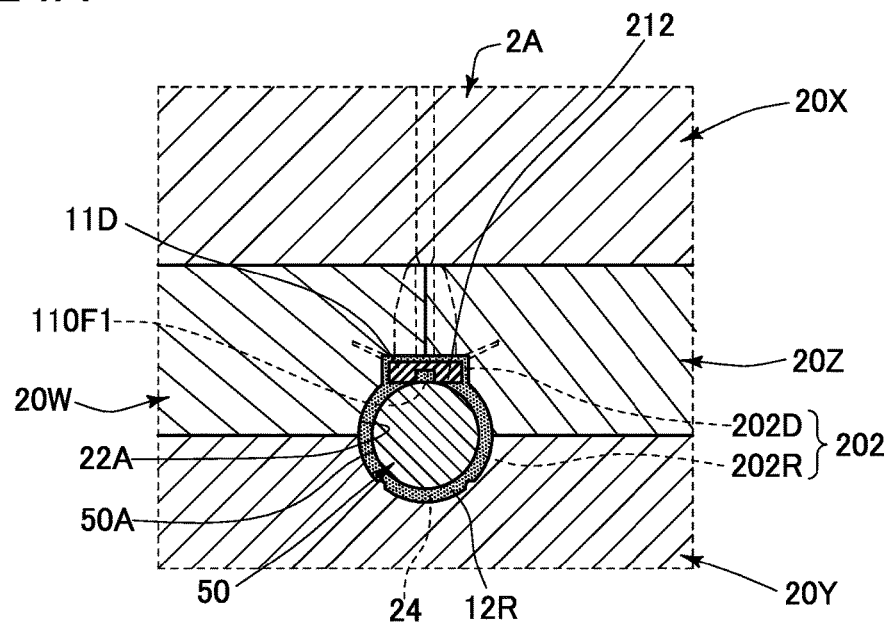
FIG. 24A is a cross sectional view taken along line I-I in FIG. 23.
Figure 24B:
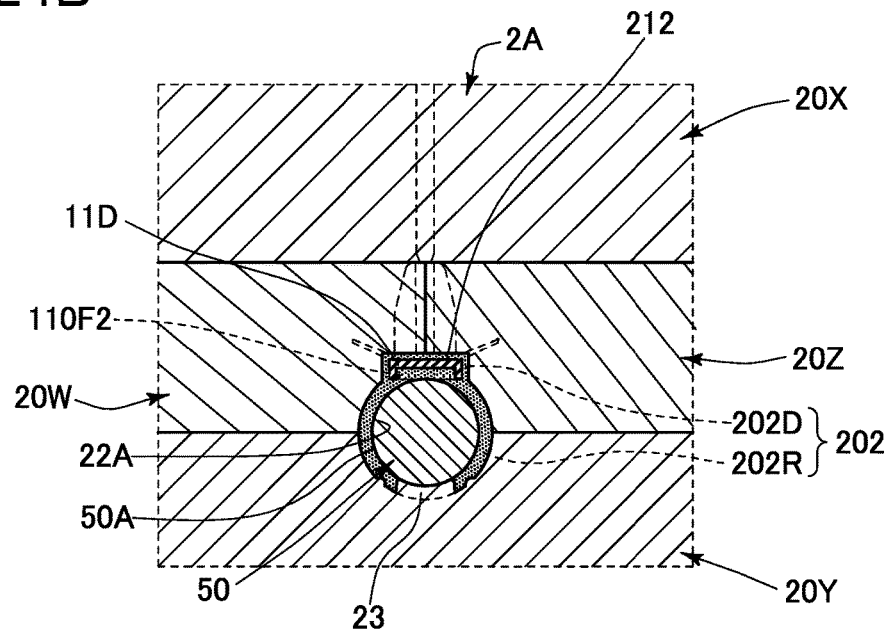
FIG. 24B is a cross sectional view taken along line II-II in FIG. 23.

A groove opening side of the groove portion. 110F here is covered with the wiring bundle 50. Thus, an inner space of the main groove portion 110F1 forms a passage surrounded by the wiring bundle 50 and an inner wall surface of the groove portion 110F (see FIG. 24A). After flowing from the penetration hole 110H into the groove portion 110F, the melt resin passes through this passage to reach the end groove portion 110F2. Both end portions of the end groove portion 110F2 with respect to the extending direction of the end groove portion 110F2 are not covered with the wiring bundle 50 (see FIG. 24B), and the melt resin flows into the retention portion-molding space 202 through these end portions to fill the retention portion-molding space 202.

The retention portion-molding space 202 is a space including an annular portion-molding space 202R for molding the annular portion 12R, which surrounds the outer circumference of the wiring bundle 50, and a connecting portion-molding space 202D which surrounds an outer circumference of the connecting portion 11D of the insert part 110, with the annular portion-molding space 202R and the connecting portion-molding space 202D being communicatively connected with each other.

Then, the poured melt resin is solidified through cooling. As a result, the retention portion 12 having the core portion 12P, the groove filling portion 12F, and the annular portion 12R is molded. Then, the metal mold 20 is opened, and the wiring bundle 50 and the retention component 10 are taken out. With this, the retention components 10 and the wire harnesses 1 as shown in FIGS. 21, 25, and 28 are obtained.

Figure 31:
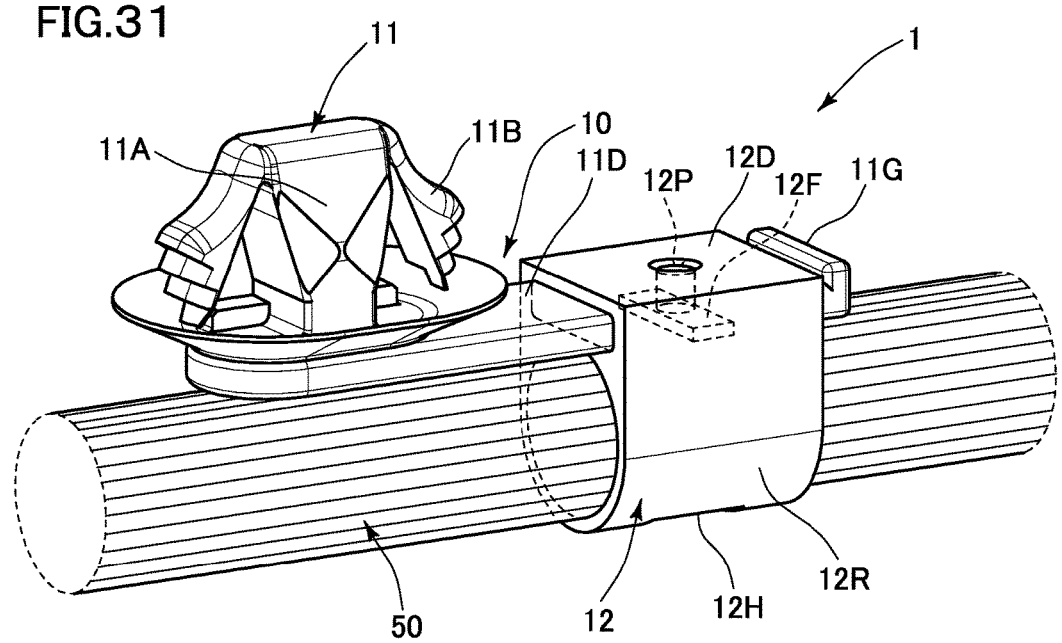
FIG. 31 is a perspective view of a wire harness according to a seventh modification of this invention.

Referring to FIG. 31, in a seventh modification of this invention, as well as in the fourth, fifth, and sixth modifications described above, a connecting portion 11D which allows the engagement portion 11 to be disposed at a position further away from the retention portion 12 in the retention component 10 and the wire harness 1 is provided. However, the seventh modification is different from the fourth, fifth, and sixth modifications described above in the method for manufacturing the wire harness 1 and the retention component 10.

Figure 32:
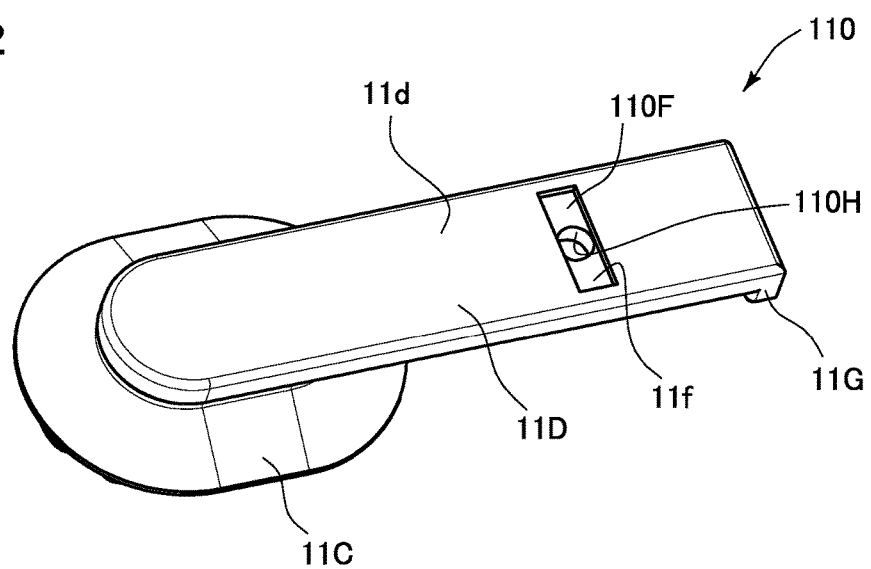
FIG. 32 is a perspective view of an insert part which is to become an engagement portion of the wire harness shown in FIG. 31.

A primary difference lies in that the penetration hole 110H of the insert part 110 is formed not in the shaft portion 11A but only in the connecting portion 11D. The penetration hole 110H according to this modification is formed so as to extend in a straight line and penetrate a tip portion (i.e., an end portion on the retention portion 12 side) of the connecting portion 11D in a thickness direction thereof. In addition, as shown in FIG. 32, the connecting portion 11D has a groove portion 110F in a surface 11*d* on a side facing away from the shaft portion 11A. The penetration hole 110H is formed so as to pass through the insert part 110 and have an opening in a groove bottom surface 11*f* of the groove portion 110G. The groove portion 110F according to this modification is formed so as to extend in a straight line in a direction perpendicular to both the long side direction 205X of the wiring bundle 50 and the penetration direction of the penetration hole 110H.

Figure 33:
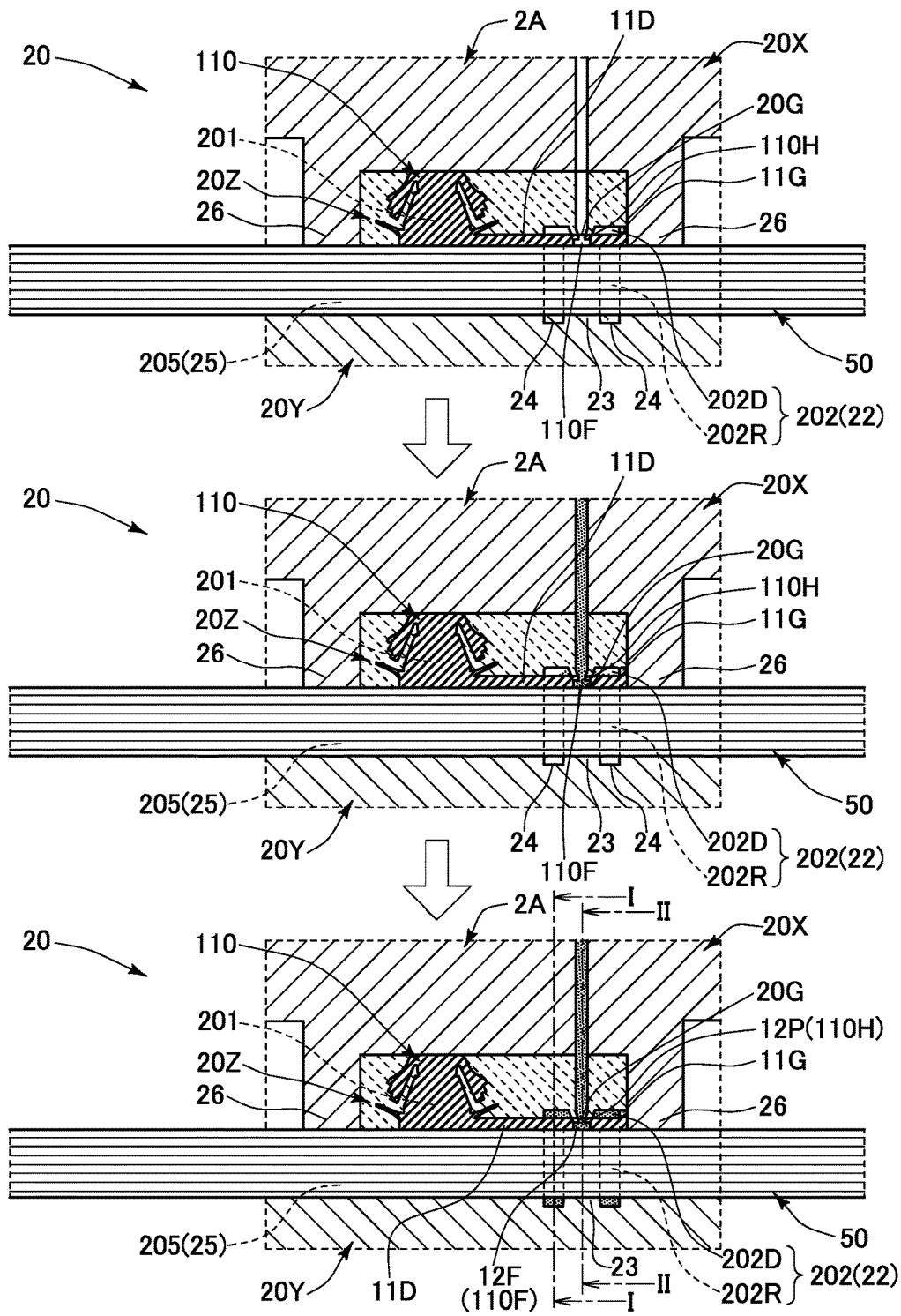
FIG. 33 is a diagram for explaining a process of manufacturing the wire harness shown in FIG. 31 using the same cross section as in FIG. 13.
Figure 34A:
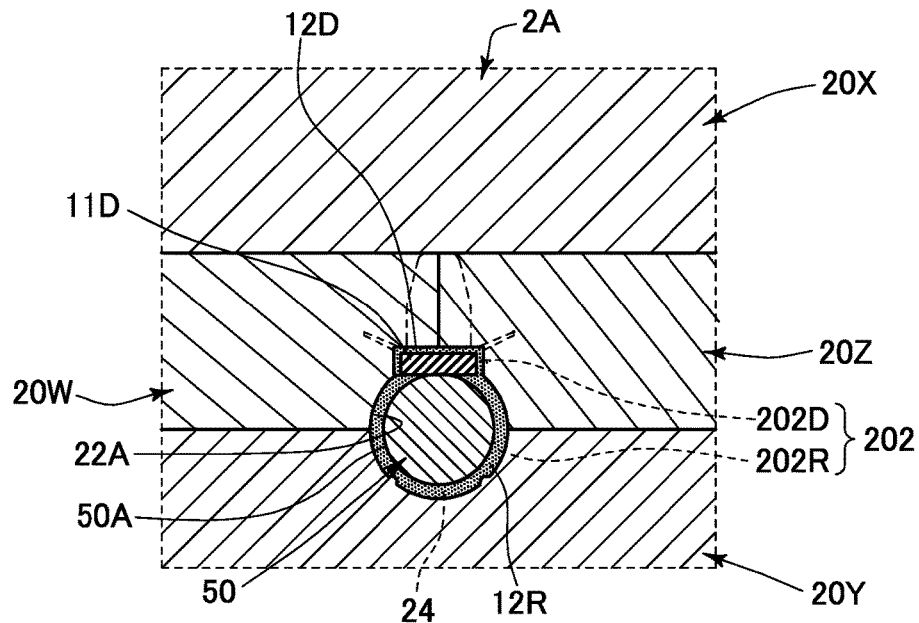
FIG. 34A is a cross sectional view taken along line I-I in FIG. 33.
Figure 34B:
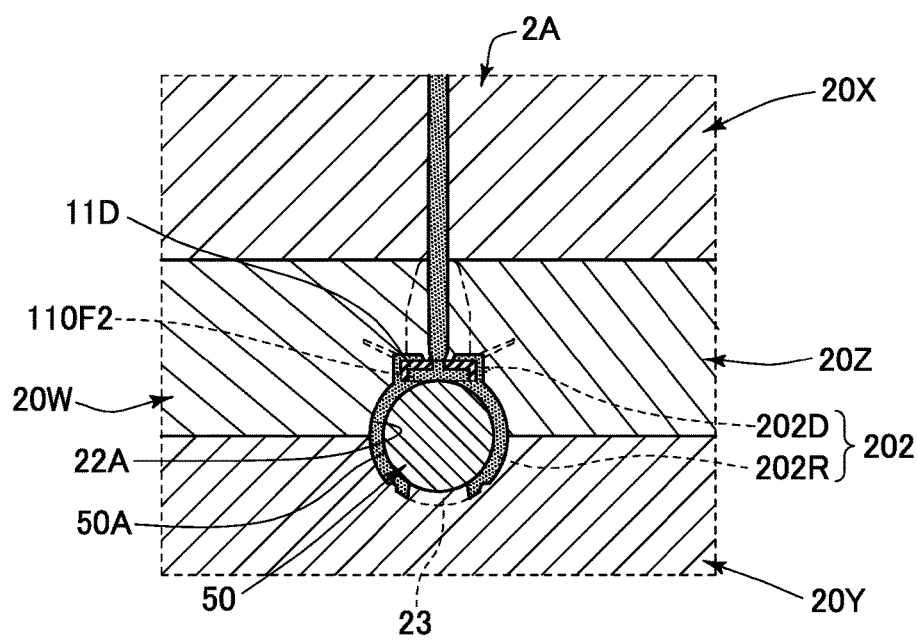
FIG. 34B is a cross sectional view taken along line II-II in FIG. 33.

When the retention component 10 and the wire harness 1 according to the seventh modification are manufactured, a metal mold 20 as shown in FIGS. 33, 34A, and 34B can be employed. First, similarly to the embodiment described above, the wiring bundle 50 is disposed in the penetration hole 205, the insert part 110 is disposed in the engagement portion-accommodating space 201, and the metal mold 20 is closed to be in the mold-closed state. Next, the resin supplying device 2A is used to pour the melt resin through a resin inflow opening 20G on the engagement portion-accommodating space 201 side. This melt resin flows into the retention portion-molding space 202 through the penetration hole 110H and the groove portion 110F formed in the connecting portion 11D. Then, the poured melt resin is solidified through cooling. As a result, the retention portion 12 having the core portion 12P, the groove filling portion 12F, and the annular portion 12R is molded. Then, the metal mold 20 is opened, and the wiring bundle 50 and the retention component 10 are taken out. With this, the retention component 10 and the wire harness 1 as shown in FIG. 31 are obtained. In FIG. 33, the penetration hole 110H and the core portion 12P molded therein are designated by reference characters "12P (110H)", and an inner space of the groove portion 110F and the groove filling portion 12F molded therein are designated by reference characters "12F (110F)". The same reference characters will be used in the following figures as well.

In the seventh modification, the resin inflow opening 20G is arranged to cause the melt resin to flow first into the penetration hole 110H of the insert part 110, and therefore, a concavity which reaches the position of the opening of the penetration hole 110H in the insert part 110 is formed in the connecting portion 12D of the retention portion 12.

Figure 35:
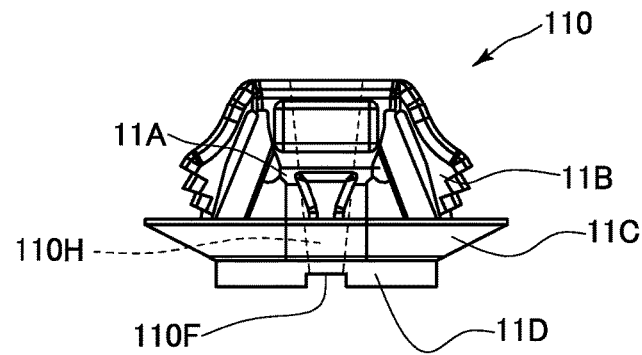
FIG. 35 is a front view of an insert part according to an eighth modification of this invention.
Figure 37:
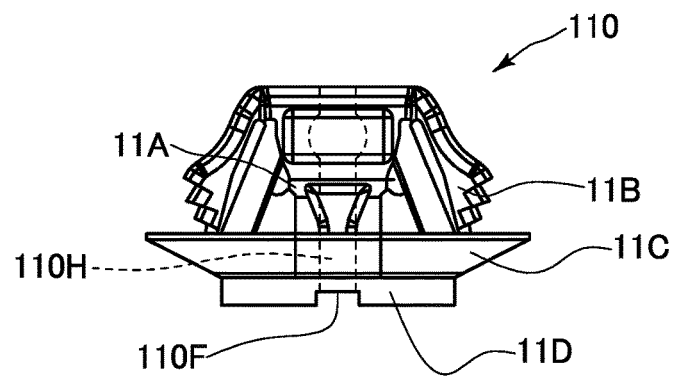
FIG. 37 is a front view of an insert part according to a ninth modification of this invention.

Wire harnesses 1 and retention components 10 according to eighth and ninth modifications of this invention are similar to the wire harness 1 and the retention component 10, respectively, according to the embodiment shown in FIGS. 1A and 1B, but the eighth and ninth modifications are different from the embodiment shown in FIGS. 1A and 1B in the shape of the insert part 110 used when manufacturing the wire harness 1 and the retention component 10 (see FIGS. 35 and 37). Except the shape of the insert part 110, the manufacturing methods according to the eighth and ninth modifications are similar to the manufacturing methods according to the other embodiments.

In the embodiment described above, when the retention portion 12 is molded using the insert part 110, the same resin material as that of the insert part 110 is used to mold the retention portion 12. Accordingly, at the time of the molding, the insert part 110 and the retention portion 12 are welded to each other to form one unitary body, with the result that the insert part 110 and the retention portion 12 are joined to each other. However, in the case where the resin material of the insert part 110 and the resin material of the retention portion 12 are different, the insert part 110 and the retention portion 12 may not be unified. Each of the eighth and ninth modifications is suitable for the case where, at the time of the molding, the insert part 110 and the retention portion 12 are not unified as described above. Specifically, in each of the eighth and ninth modifications, the core portion 12P of the retention portion 12 includes a detachment preventing portion 12*p*. This detachment preventing portion 12*p* prevents the core portion 12P of the retention portion 12 from being detached from the penetration hole 110H of the the result that the insert part 110 and the retention portion 12 are inseparably joined to each other.

Figure 36:
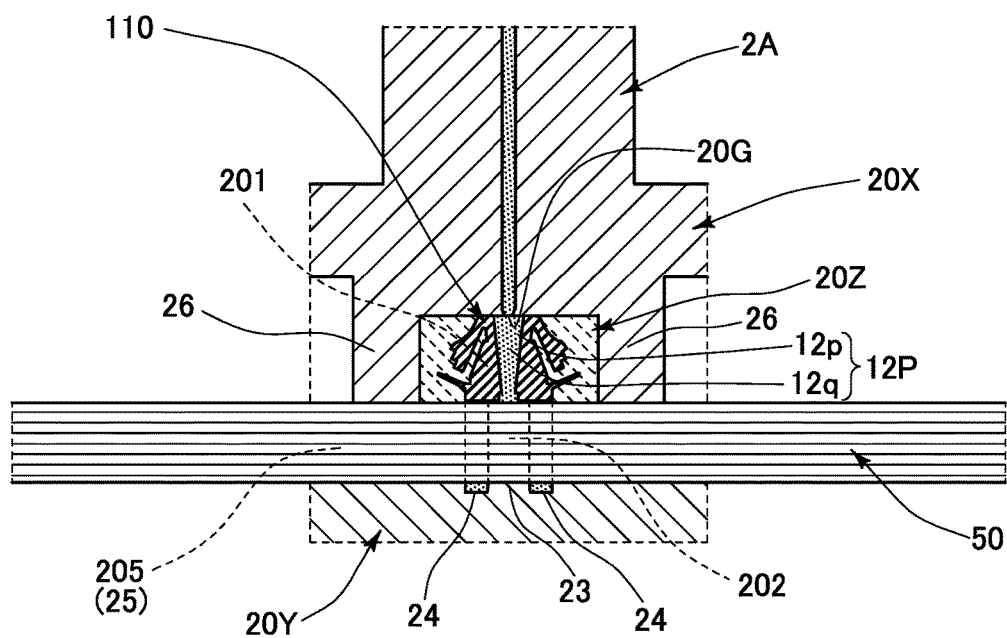
FIG. 36 is a diagram for explaining a process of manufacturing a wire harness using the insert part shown in FIG. 35 using the same cross section as in FIG. 13.
Figure 38:
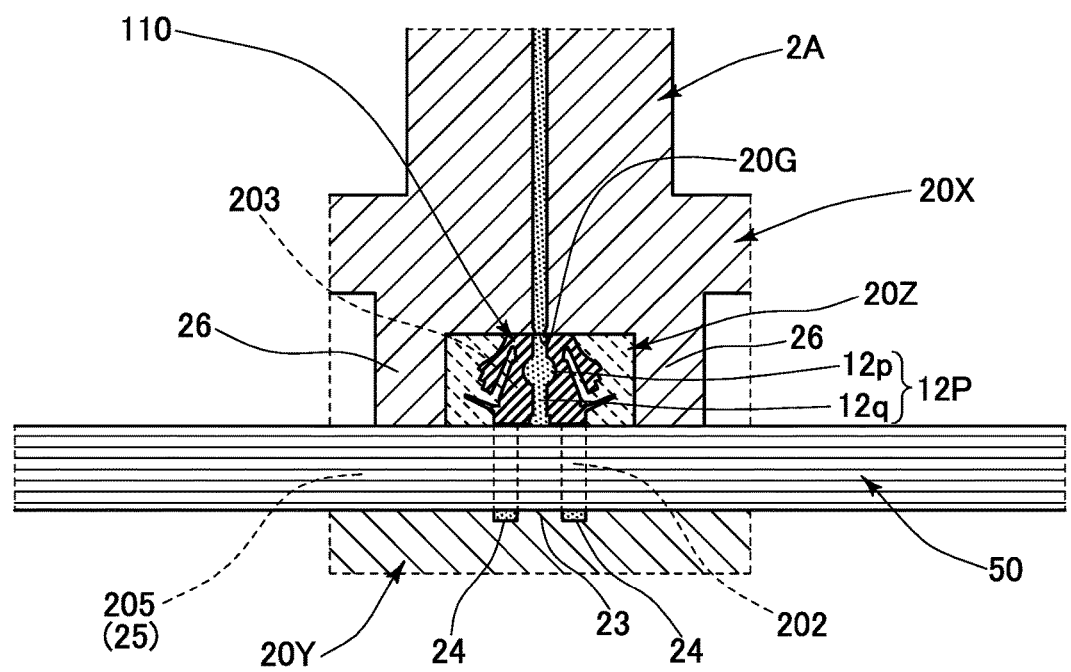
FIG. 38 is a diagram for explaining a process of manufacturing a wire harness using the insert part shown in FIG. 37 using the same cross section as in FIG. 13.

For example, as shown in FIGS. 36 and 38, the core portion 12P may include a central shaft portion 12*q* having a cross section identical to the cross section of an opening on the retention portion side, the cross section being perpendicular to an axis of the core portion 12P, and an outer circumferential portion 12*p* which expands in directions perpendicular to the axis of the core portion 12P. In this case, the outer circumferential portion 12*p* forms the detachment preventing portion.

In the eighth modification, the penetration hole 110H of the insert part 110 forms a tapered shape, with the cross-sectional area of the penetration hole 110H decreasing toward the retention portion 12 in the axial direction thereof as shown in FIG. 36. Accordingly, the core portion 12P of the retention portion 12, which is arranged in the penetration hole 110H, also forms the same tapered shape as that of the penetration hole 110H. The aforementioned detachment preventing portion 12*p* corresponds to an outer circumferential portion 12*p* which forms a tapered slanting surface in the core portion 12P forming the aforementioned tapered shape.

In the ninth modification, the penetration hole 110H of the insert part 110 is so shaped as to have an expanding space that expands outward at an intermediate section (here, at a middle position) of the penetration hole 110H in the axial direction thereof as shown in FIG. 38. Accordingly, similarly to the penetration hole 110H, the core portion 12P of the retention portion 12, which is arranged in the penetration hole 110H, also has an outer circumferential portion (which can be referred to also as an expanding portion or an increased diameter portion) 12*p* which expands outward at the intermediate section. This outer circumferential portion 12*p* forms the aforementioned detachment preventing portion 12*p*.

In the tenth modification of this invention, the insert part 110 is not prepared beforehand as in the embodiment described above, but the molding of the insert part 110 and the molding of the retention portion 12 are conducted successively.

Figure 39:
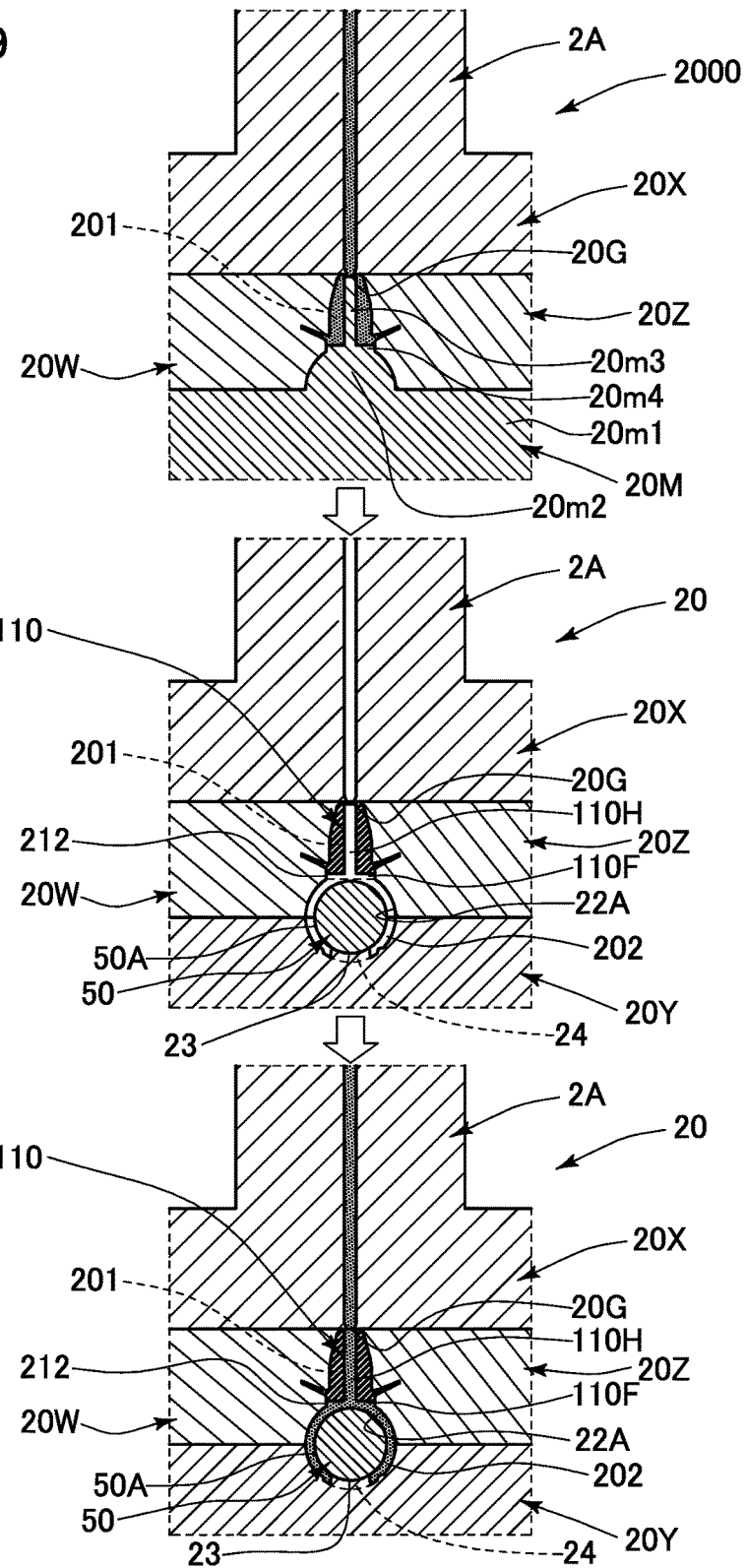
FIG. 39 is a diagram for explaining a process of manufacturing a wire harness according to a tenth modification of this invention using the same cross section as in FIG. 14.
Figure 4O:
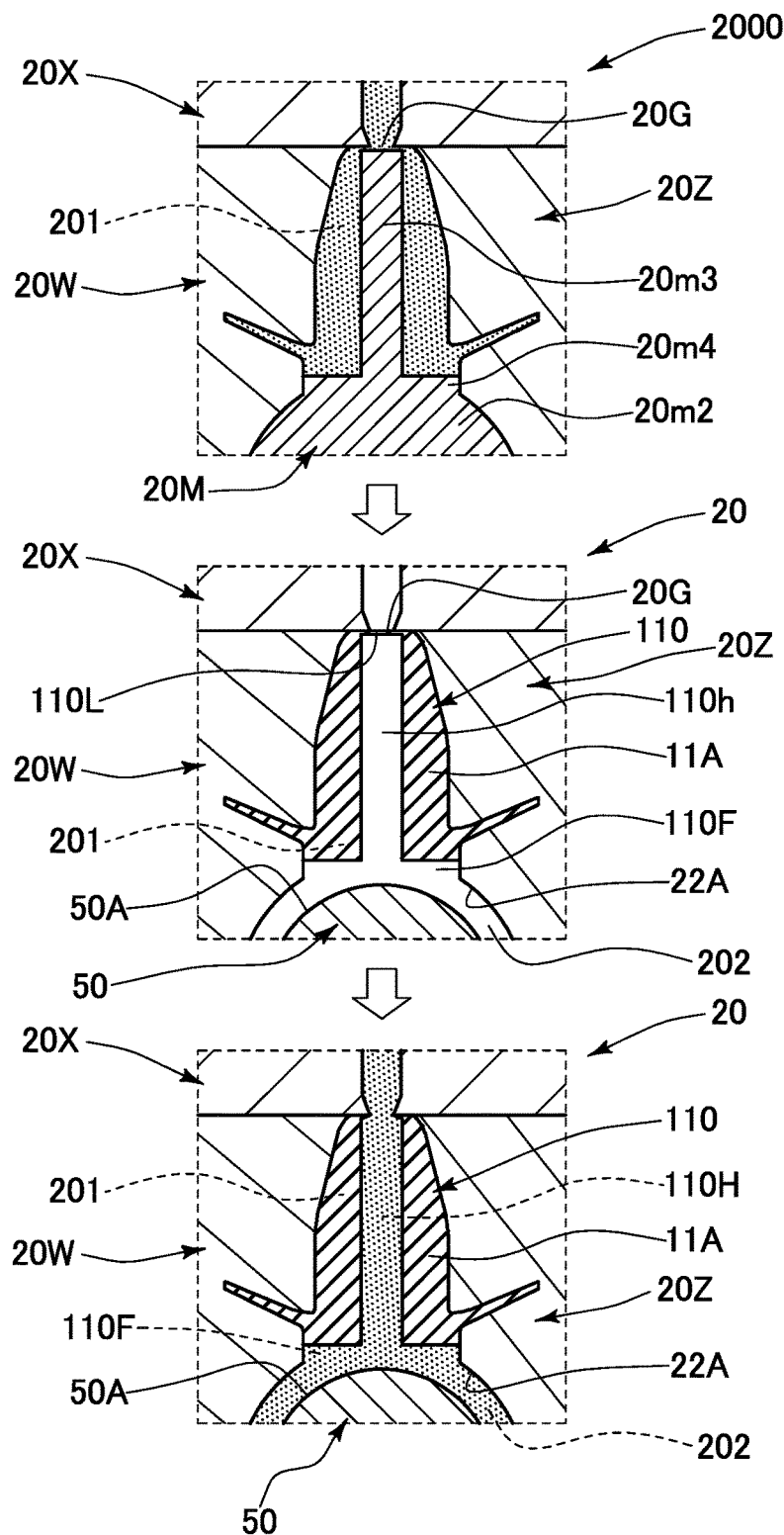

First, the insert part 110 is molded. Here, as shown in FIG. 39, the slide molds 20W and 20Z for forming the engagement portion-accommodating space 201, and the movable mold 20X used in the embodiment described above are used. Further, a fixed mold 20M for molding the insert part is used. The fixed mold 20M has a mold bottom portion 20*m*1, a protruding portion 20*m*2, a groove-forming projecting portion 20*m*4, and a penetration hole-forming insert portion 20*m*3. The protruding portion 20*m*2 is a portion that protrudes upward from the mold bottom portion 20m1, and is fitted to the slide molds 20W and 20Z from below so as to bury the penetration hole-forming concavity 25 and the retention portion-forming concavity 22. The groove-forming projecting portion 20m4 is a projecting portion that projects upward from an upper end surface of the protruding portion 20m2, and molds the groove portion 110F of the insert part 110. The penetration hole-forming insert portion 20m3 is a columnar portion that extends upward from the groove-forming projecting portion 20m4 to assume the shape of a column (here, a round column), and molds the penetration hole 110H of the insert part 110.

The movable mold 20X, the slide molds 20W and 20Z disposed below the movable mold 20X, and the fixed mold 20M disposed below the slide molds 20W and 20Z are closed to form a metal mold 2000. Inside the metal mold 2000 in the mold-closed state, only the engagement portion-accommodating space 201 exists as a molding space. The engagement portion-accommodating space 201 is a space in which the insert part 110 is to be disposed later, but, here, is also a space for molding the insert part 110, and therefore can be referred to also as an engagement portion-molding space (or an insert part-molding space) 201. A resin inflow opening (a so-called gate) 20G in the metal mold 2000 is located above the penetration hole-forming insert portion 20m3.

The resin supplying device 2A is used to pour the melt resin into the metal mold 2000 through the resin inflow opening 20G (see the top diagram in FIG. 29). As a result, the melt resin is loaded in the engagement portion-accommodating space 201 of the metal mold 2000. The loaded melt resin is solidified through cooling to form the insert part 110.

Next, with the movable mold 20X and the slide molds 20W and 20Z remaining, the fixed mold 20M is replaced with the fixed mold 20Y used in the embodiment described above, and the movable mold 20X, the slide molds 20W and 20Z, and the fixed mold 20Y are closed (see the middle diagram in FIG. 39). Note, however, that the fixed mold 20Y at this time has the wiring bundle 50 disposed in the penetration hole-forming concavity 25 as shown in FIG. 9. As a result of the above mold closing, the metal mold 20 in the embodiment described above is obtained. That is, the metal mold 20 at this time is in a situation in which, as shown in the top diagram in FIG. 13, for example, the movable mold 20X, the slide molds 20W and 20Z, and the fixed mold 20Y are closed with the retention portion-molding space 202 being formed therein and the insert part 110 disposed in the engagement portion-accommodating space 201 therein.

The resin supplying device 2A is used again to pour the melt resin into the metal mold 20 through the resin inflow opening 20G (see the bottom diagram in FIG. 39). As is similarly the case with the embodiment described above, the melt resin flows into the retention portion-molding space 202 through the penetration hole 110H and the inner space of the groove portion 110F formed in the insert part 110. Then, the poured melt resin is solidified through cooling. This completes the molding of the retention portion 12. Thereafter, the metal mold 20 is opened, and the wiring bundle 50 and the retention component 10 are taken out, so that the retention component 10 and the wire harness similar to those according to the embodiment described above are obtained.

Regarding the metal mold 2000, as shown in the top diagram in FIG. 39, a tip (i.e., an upper end in the diagram) of the penetration hole-forming insert portion 20m3 of the fixed mold 20M may cover the resin inflow opening 20G to prevent an inflow of the melt resin into the engagement portion-accommodating space 201 through the resin inflow opening 20G.

Accordingly, as shown in FIG. 40, for example, a method of forming a slight gap between a top end surface (i.e., an upper end surface in the figure) of the penetration hole-forming insert portion 20m3 and the resin inflow opening 20G may be adopted. In this case, the melt resin flows into the engagement portion accommodating space 201 through this slight gap (see the top diagram in FIG. 40). The melt resin is solidified through cooling, and the fixed mold 20M is removed to obtain the insert part 110 in the engagement portion-accommodating space 201. In the insert part 110, a future penetration hole portion 110h formed by a non-through hole, which is to become the penetration hole 110H, is molded (see the middle diagram in FIG. 40). In other words, the insert part 110 has the future penetration hole portion 110h, which forms a columnar space, and a thin film portion 110L having a small thickness and arranged at an upper end of the future penetration hole portion 110h. Then, with the insert part 110 being disposed in the engagement portion-accommodating space 201, the fixed mold 20Y is fitted to the movable mold 20X and the slide molds 20W and 20Z. The melt resin is again poured into the metal mold 20 in the mold-closed state through the resin inflow opening 20G, and then, the melt resin breaks through the thin film portion 110L (see the bottom diagram in FIG. 40). As a result, the future penetration hole portion 110h becomes the penetration hole 110H. After breaking through the thin film portion 110L, the melt resin flows into the inner space of the groove portion 110F through the penetration hole 110H, and then into the retention portion-molding space 202. Then, the poured melt resin is solidified through cooling to complete the molding of the retention portion 12. Thereafter, the metal mold 20 is opened, and the wiring bundle 50 and the retention component 10 are taken out, so that the retention component 10 and the wire harness 1 similar to those according to the embodiment described above are obtained.

Figure 41:
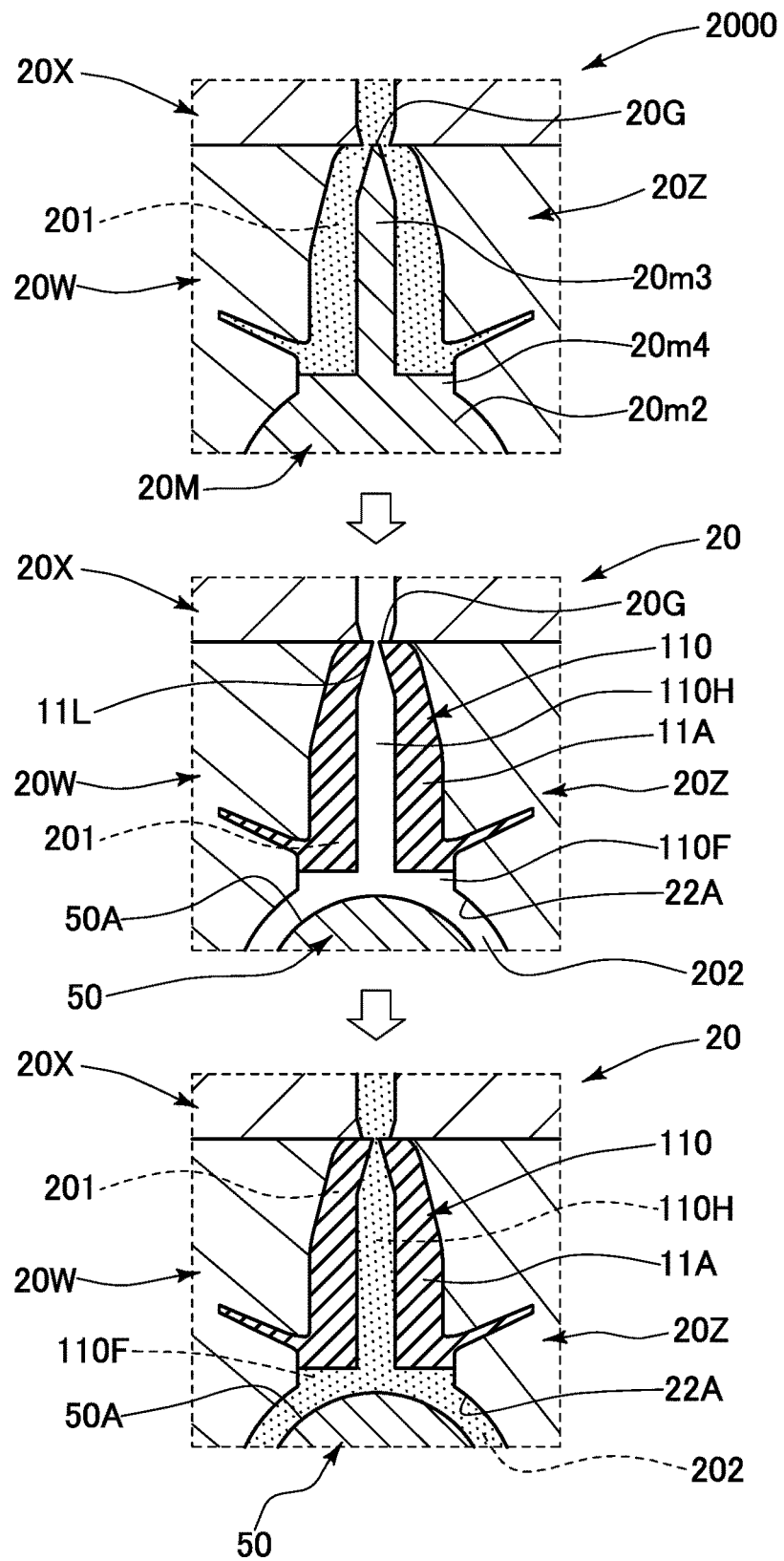
FIG. 41 is a diagram for explaining a second specific example related to the manufacturing process shown in FIG. 39, using the same cross section as in FIG. 14.

Further, as shown in FIG. 41, a method of providing the penetration hole-forming insert portion 20m3 with a tapered top may be adopted. In this case, the melt resin smoothly flows into the engagement portion-accommodating space 201, passing outside of an outer circumference of the tapered top of the penetration hole-forming insert portion 20m3 (see the top diagram in FIG. 41). The melt resin is solidified through cooling, and the fixed mold 20M is removed to obtain the insert part 110 in the engagement portion-accommodating space 201. In the insert part 110, a penetration hole 110H having a tapered shape is molded (see the middle diagram in FIG. 41). At this time, an upper end of the penetration hole 110H has an opening having an area smaller than the area of the resin inflow opening 20G. Then, with the insert part 110 being disposed in the engagement portion-accommodating space 201, the fixed mold 20Y is fitted to the movable mold 20X and the slide molds 20W and 20Z. The melt resin is again poured into the metal mold 20 in the mold-closed state through the resin inflow opening 20G, and then, the melt resin flows into the penetration hole 110H through the opening having an area smaller than the area of the resin inflow opening 20G (see the bottom diagram in FIG. 41). After flowing into the penetration hole 110H, the melt resin flows into the inner space of the groove portion 110F through the penetration hole 110H, and then into the retention portion-molding space 202. Then, the poured melt resin is solidified through cooling to complete the molding of the retention portion 12. Thereafter, the metal mold. 20 is opened, and the wiring bundle 50 and the retention component 10 are taken out, so that the retention component 10 and the wire harness 1 similar to those according to the embodiment described above are obtained.

Figure 42:
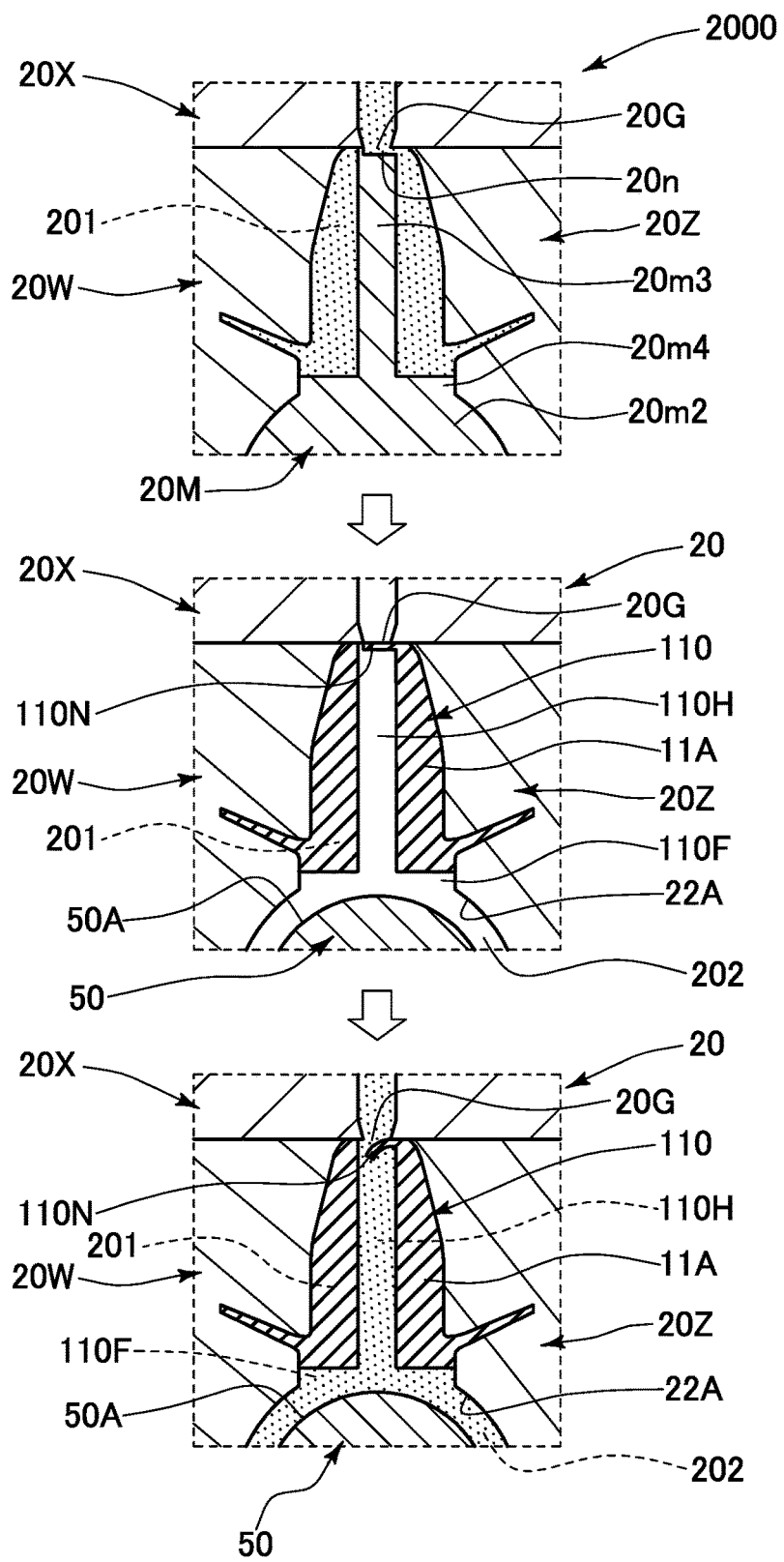
FIG. 42 is a diagram for explaining a third specific example related to the manufacturing process shown in FIG. 39, using the same cross section as in FIG. 14.
Figure 43:
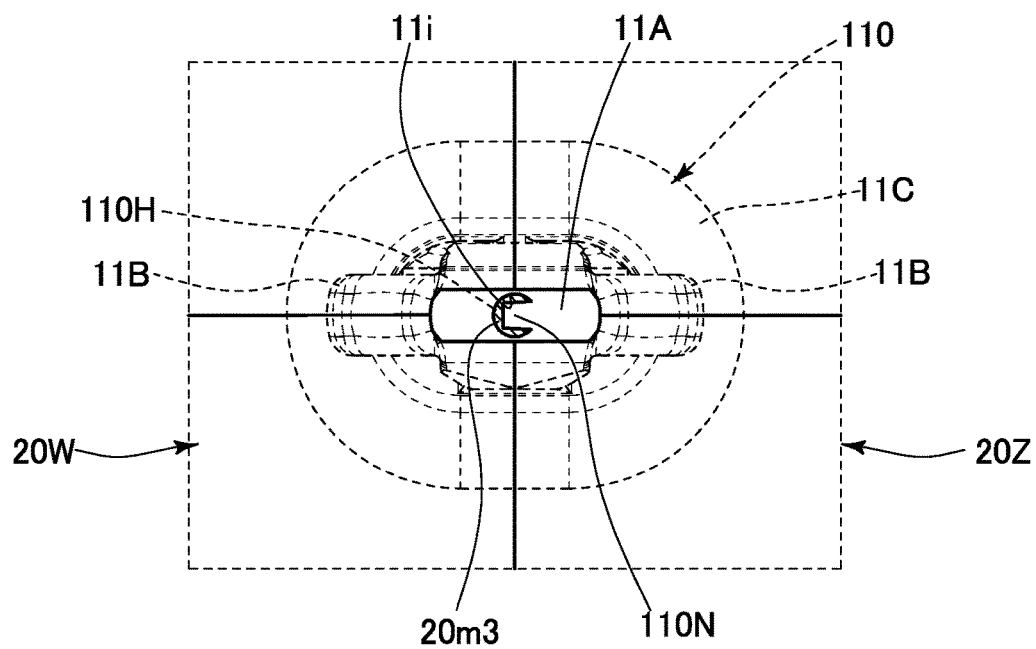
FIG. 43 is a diagram showing upper surfaces of slide molds is a mold-closed state shown in the middle diagram in FIG. 42.

Further, as shown in FIG. 42, a method of molding a tongue portion 110N that closes the resin inflow opening 20G between a top end surface (i.e., an upper end surface in the figure) of the penetration hole-forming insert portion 20m3 and the resin inflow opening 20G may be adopted. In this case, the melt resin flows into the engagement portion-accommodating space 201 through a tongue portion-molding space 20n for molding the tongue portion 110N (see the top diagram in FIG. 42). The melt resin is solidified through cooling, and the fixed mold 20M is removed to obtain the insert part 110 in the engagement portion-accommodating space 201. In the insert part 110, a penetration hole 110H is molded (see the middle diagram in FIG. 42 and FIG. 43). Note, however, that, the tongue portion 110N is formed at an upper end opening of the penetration hole 110H. As shown in FIG. 43, the tongue port, on 110N is arranged to extend from a section of an edge 11i of the upper end opening of the penetration hole 110H toward the upper end opening so as to close the resin inflow opening 20G. Meanwhile, a tip portion of the tongue portion 110N permits upward/downward elastic deformation. With the insert part 110 being disposed in the engagement portion-accommodating space 201, the fixed mold 20Y is fitted to the movable mold 20X and the slide molds 20W and 20Z. Then, the melt resin is again poured into the metal mold 20 in the mold-closed state through the resin inflow opening 20G, and the melt resin presses the tongue portion 110N closing the resin inflow opening 20G downward (see the bottom diagram in FIG. 42). As a result, the resin inflow opening 20G and the penetration hole 110H are communicatively connected with each other, and the melt resin flows into the inner space of the groove portion 110F through the penetration hole 110H, and then into the retention portion-molding space 202. Then, the poured melt resin is solidified through cooling to complete the molding of the retention portion 12. Thereafter, the metal mold 20 is opened, and the wiring bundle 50 and the retention component 10 are taken out, so that the retention component 10 and the wire harness 1 similar to those according to the embodiment described above are obtained.

Figure 44:
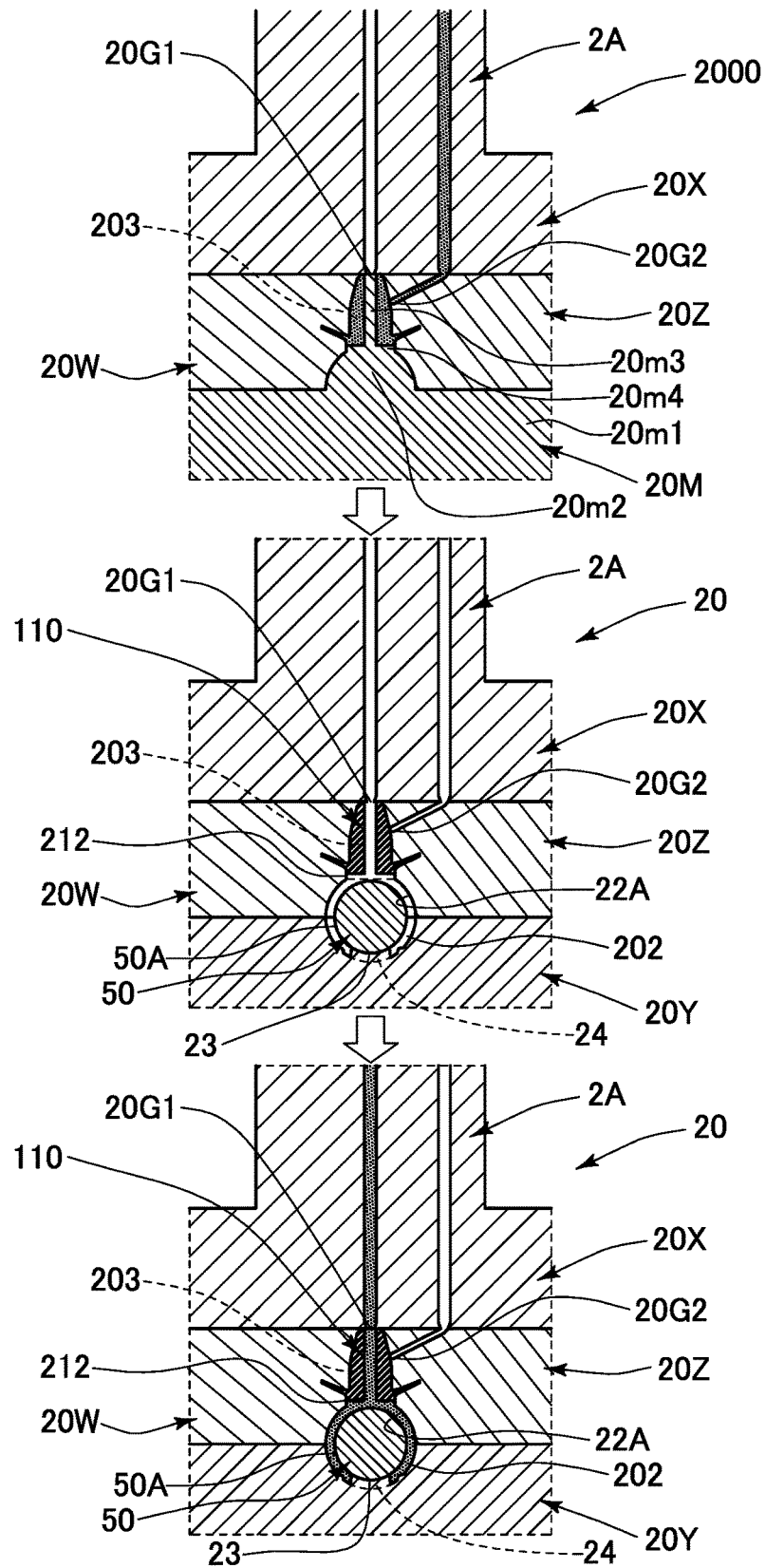
FIG. 44 is a diagram for explaining a fourth specific example related to the manufacturing process shown in FIG. 39, using the same cross section as in FIG. 14.

Further, as shown in FIG. 44, a resin inflow opening 20G2 for molding the insert part 110, and a resin inflow opening 20G1 for molding the retention portion 12 may be provided separately, and the melt resin may be poured through a corresponding one of the resin inflow openings 20G2 and 20G1 when each of the insert part 110 and the retention portion 12 is molded.

DESCRIPTION OF THE REFERENCE CHARACTERS 1 wire harness
10 retention component
11 engagement portion
11A shaft portion
11D connecting portion
110 insert part
110H penetration hole
110F groove portion
12 retention portion
12P core portion
12F groove filling portion
12R annular portion
12D connecting portion
2 molding machine
2A supplying device (resin supply means)
2B control unit
20 metal mold
20X movable mold
20Y fixed mold (fixed mold for molding retention portion)
20M fixed mold for molding insert part
20W, 20Z slide mold
inflow opening (gate)
201 engagement portion-accommodating space
202 retention portion-molding space
205 penetration hole (wiring bundle disposition hole)
205 penetration direction
21 engagement portion-accommodating concavity
22 retention portion-forming concavity
23 hole-forming portion
5 wiring member
50 wiring bundle
50A outer circumferential surface of wiring bundle

What is claimed is:

1. A method for manufacturing a wire harness including an engagement portion to be attached to a vehicle body, a wiring bundle formed of multiple wiring members, and a retention portion configured to retain the wiring bundle,
with usage of a metal mold having: a wiring bundle disposition hole in which the wiring bundle is penetratingly disposed; an annular retention portion-molding space arranged at an intermediate section of the wiring bundle disposition hole to surround an outer circumference of the disposed wiring bundle; an engagement portion-accommodating space in which an insert part having a penetration hole formed therein and which is to become the engagement portion is disposed such that the penetration hole is communicatively connected with the retention portion-molding space; and a resin inflow opening through which a melt resin is poured into the penetration hole of the insert part disposed in the engagement portion-accommodating space,
the method comprising:
penetratingly disposing the wiring bundle in the wiring bundle disposition hole of the metal mold;
disposing the insert part in the engagement portion-accommodating space;
pouring the melt resin through the resin inflow opening to load the melt resin to the retention portion-molding space through the penetration hole of the insert part; and
solidifying the melt resin through cooling to form the wire harness, the wire harness including the wiring bundle, the retention portion, and the engagement portion formed by the insert part, the retention portion having an annular portion molded in a state of being closely adhered to a rugged outer circumferential surface of the wiring bundle in the retention portion-molding space, and a core portion molded in the penetration hole, the annular portion and the core portion being molded integrally with each other, the retention portion being joined to the insert part.

2. The method for manufacturing the wire harness according to claim 1, wherein the insert part includes a penetration hole width increasing opening portion that opens on a side of the penetration hole on which the retention portion is joined to the insert part so as to increase a hole width of the penetration hole.

3. The method for manufacturing the wire harness according to claim 1, wherein the metal mold is provided with a central position retention means configured to retain the wiring bundle disposed in the wiring bundle disposition hole such that the wiring bundle passes through a central portion of the annular retention portion-molding space.

4. The method for manufacturing the wire harness according to claim 3, wherein the metal mold includes, as the central position retention means, a hole-forming portion which is positioned so as to make contact with the outer circumferential surface of the wiring bundle penetratingly disposed in the wiring bundle disposition hole, and is configured to form a hole portion that penetrates the molded annular retention portion in an inward/outward direction.

5. The method for manufacturing the wire harness according to claim 1, wherein
when having become the engagement portion after molding of the retention portion, the insert part includes: a shaft portion inserted into a predetermined attachment hole on the vehicle body side; an elastic engagement portion having a shape extending out so as to expand outwards from the shaft portion, and engaged and attached to a surrounding portion of the attachment hole; and a connecting portion joined and connected to the retention portion, the shaft portion, the elastic engagement portion, and the connecting portion being integrally molded, and
the connecting portion is an arm portion extending in a direction perpendicular to an axial direction of the shaft portion, and joined to the retention portion on an extension top side.

6. The method for manufacturing the wire harness according to claim 5, wherein
the penetration hole of the insert part is formed in the shaft portion so as to extend in the axial direction of the shaft portion, and penetrates the connecting portion as well, the connecting portion being located at an end portion of the shaft portion, the connecting portion having formed therein a groove portion extending in an extending direction of the connecting portion, the penetration hole being communicatively connected with an inner space of the groove portion, and
when the melt resin is poured into the metal mold through the resin inflow opening in a state where the wiring bundle is penetratingly disposed in the wiring bundle disposition hole and the insert part is disposed in the engagement portion-accommodating space, the melt resin flows into the retention portion-molding space through the penetration hole and the inner space of the groove portion, and is solidified through cooling in a state where the melt resin is loaded in the penetration hole, the inner space of the groove portion, and the retention portion-molding space.

7. The method for manufacturing the wire harness according to claim 1, wherein the retention portion and the insert part are molded of different resin materials, and the core portion of the retention portion includes a detachment preventing portion configured to prevent a detachment from the insert part which is to become the engagement portion, the core portion being molded as a result of the melt resin being loaded in the penetration hole and solidified through cooling.

* * * * *